(12) United States Patent
Motohashi et al.

(10) Patent No.: US 9,761,971 B2
(45) Date of Patent: Sep. 12, 2017

(54) CARD HOLDING MEMBER AND CARD CONNECTOR, WHICH PREVENTS SHORT-CIRCUITS, PREVENTS DAMAGE AND WEAR, ENABLES EASIER HANDLING, AND IMPROVES RELIABILITY

(71) Applicant: Molex, LLC, Lisle, IL (US)

(72) Inventors: Nobumasa Motohashi, Yamato (JP); Akihiro Shimotsu, Ebina (JP); Nobuki Ukita, Yamato (JP); Yudai Morinaga, Yamato (JP); Toshitaka Kusuhara, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/728,768

(22) Filed: Jun. 2, 2015

(65) Prior Publication Data

US 2016/0028172 A1 Jan. 28, 2016

(30) Foreign Application Priority Data

Jun. 6, 2014 (JP) .................................. 2014-117708
Mar. 19, 2015 (JP) .................................. 2015-055944
Apr. 2, 2015 (JP) .................................. 2015-075584

(51) Int. Cl.
*H01R 24/00* (2011.01)
*H01R 12/71* (2011.01)
*H01R 13/703* (2006.01)
*H04B 1/3816* (2015.01)

(52) U.S. Cl.
CPC ....... *H01R 12/716* (2013.01); *H01R 13/7031* (2013.01); *H04B 1/3816* (2013.01)

(58) Field of Classification Search
CPC .... H01R 12/721; H01R 12/72; H01R 13/633; Y10S 439/951
USPC .................................... 439/630, 951, 607.31
See application file for complete search history.

(56) References Cited

U.S. PATENT DOCUMENTS

| | | | |
|---|---|---|---|
| 6,695,650 B2 | 2/2004 | Mueller | |
| 8,021,175 B2* | 9/2011 | Kim | G06K 7/0021 439/159 |
| 8,439,696 B2* | 5/2013 | Zhou | G06K 13/08 439/188 |
| 8,794,986 B2* | 8/2014 | Takasaki | H01R 12/721 439/157 |
| 9,378,436 B2* | 6/2016 | Wang | G06K 13/08 |
| 2006/0240713 A1* | 10/2006 | Kikuchi | G06K 7/0021 439/630 |

(Continued)

FOREIGN PATENT DOCUMENTS

| | | |
|---|---|---|
| CN | 202259807 U | 5/2012 |
| CN | 103378478 A | 10/2013 |

(Continued)

*Primary Examiner* — Hae Moon Hyeon
(74) *Attorney, Agent, or Firm* — James A. O'Malley

(57) ABSTRACT

A card holding member includes: a front frame portion and a rear frame portion extending in the transverse direction, and side frame portions connecting both ends of the front frame portion and both ends of the rear frame portion, the side surfaces of a card including terminal members arranged on a terminal accommodating surface being surrounded thereby; and a metal portion and a resin portion, at least a portion of the metal portion being exposed at the front end of the front frame portion.

13 Claims, 21 Drawing Sheets

(56) References Cited

U.S. PATENT DOCUMENTS

| | | | | |
|---|---|---|---|---|
| 2008/0299829 A1* | 12/2008 | Kim | ...................... | G06K 7/0021 |
| | | | | 439/630 |
| 2009/0275239 A1* | 11/2009 | Zhang | ................ | H01R 12/7005 |
| | | | | 439/630 |
| 2010/0216345 A1* | 8/2010 | Kiryu | ................... | G06K 7/0021 |
| | | | | 439/630 |
| 2010/0234070 A1 | 9/2010 | Li et al. | | |
| 2011/0039442 A1* | 2/2011 | Kim | ...................... | G06K 7/0021 |
| | | | | 439/377 |
| 2012/0129370 A1* | 5/2012 | Zhou | ...................... | G06K 13/08 |
| | | | | 439/188 |
| 2012/0276780 A1* | 11/2012 | Hu | ....................... | H01R 12/714 |
| | | | | 439/630 |
| 2014/0113495 A1* | 4/2014 | Lim | ...................... | H01R 27/00 |
| | | | | 439/630 |
| 2014/0315404 A1* | 10/2014 | Wang | .................... | G06K 13/08 |
| | | | | 439/159 |
| 2016/0028172 A1 | 1/2016 | Motohashi et al. | | |

FOREIGN PATENT DOCUMENTS

| | | |
|---|---|---|
| CN | 204067707 U | 12/2014 |
| CN | 204144539 U | 2/2015 |
| JP | 3189346 U | 7/2001 |
| JP | 2006-302684 A | 11/2006 |
| JP | 2010-170707 A | 8/2010 |
| JP | 2012-234669 A | 11/2012 |
| JP | 2013-222653 A | 10/2013 |
| TW | M413238 U | 10/2011 |
| TW | M475715 Y | 4/2014 |

\* cited by examiner (a)

(b)

CARD HOLDING MEMBER AND CARD CONNECTOR, WHICH PREVENTS SHORT-CIRCUITS, PREVENTS DAMAGE AND WEAR, ENABLES EASIER HANDLING, AND IMPROVES RELIABILITY

RELATED APPLICATIONS

This application claims priority to Japanese Application No. 2014-117708, filed Jun. 6, 2014, to Japanese Application No. 2015-055944, filed Mar. 19, 2015, and to Japanese Application No. 2015-075584, filed Apr. 2, 2015, all of which are incorporated herein by reference in their entirety.

TECHNICAL FIELD

The present invention relates to a card holding member and to a card connector.

BACKGROUND ART

Electronic devices such as personal computers, cell phones, personal digital assistants (PDAs), digital cameras, video cameras, music players, gaming devices and car navigation systems include card connectors to allow various types of memory cards to be used. These include Subscriber Identity Module (SIM) cards, Multi-media Cards® (MMC), Secure Digital® (SD) cards, miniSD® cards, xDPicture® cards, Memory Sticks®, Memory Stick Duo®, Smart Media®, TransFlash® memory cards, and MicroSD® cards.

Electronic devices have become much smaller in recent years, and the cards and card connectors used in these devices have become much smaller too. As a result, it is difficult for a user to grasp a card with the fingers and correctly insert the card in a card connector. Therefore, a card connector has been proposed in which a card is set into a card tray beforehand, and the card tray is inserted (see, for example, Patent Document 1).

FIG. 19 is a drawing of a card tray of the prior art.

In this figure, 961 is the card tray which is housed in a card connector (not shown) with a card mount inside (not shown). This card tray 961 has a bottom panel 962 made of metal, and both edges of the bottom panel 962 have side walls 964 made of resin formed in the bent section.

Each side wall 964 has a first and second recessed portion 968a, 968b. The card tray 961 is held in a predetermined position inside the card connector by engaging the first and second recessed portion 968a, 968b with metal pressing pieces in the card connector.

The card is, for example, a SIM card, which has electrode pads formed so that they are exposed on one surface, and the card is mounted in the card tray 961 with the other surface facing the bottom panel 962.

[Patent Document 1] PCT Application Domestic Publication No. 2011-519464

SUMMARY OF THE INVENTION

However, in the card tray 961 of the prior art, because the curved portion on both edges of the metal bottom panel 962 are exposed on an inside portion of the side walls 964, when a card having exposed electrode pads on the peripheral edges of the card main body is mounted, some of the electrode pads may establish contact and create a short circuit. In the case of cards that are especially small, such as microSIM cards, the electrode pads are formed over an entire surface, and the edges are exposed on the peripheral edges of the card main body.

Also, because the first and second recessed portions 968a, 968b on the side walls 964 are made of plastic, repeated insertion and removal of the card tray 961 from a card connector causes the resin portions of the side walls 964 to come into repeated sliding contact with the metal pressing pieces of the card connector and to wear down.

It is an object of the present invention to solve the problem associated with the prior art by providing a card holding member and card connector which prevents short-circuits, prevents damage and wear, enables easier handling, and improves reliability.

For this reason, the present invention is a card holding member comprising (a) a front frame portion and a rear frame portion extending in the transverse direction, and side frame portions connecting both ends of the front frame portion and both ends of the rear frame portion, the side surfaces of a card including terminal members arranged on a terminal accommodating surface being surrounded thereby; and (b) a metal portion and a resin portion, (c) at least a portion of the metal portion being exposed at the front end of the front frame portion.

The present invention is also a card holding member in which the metal portion includes a side wall tiered portion exposed in at least a portion of an outer side surface of the side frame portions.

The present invention is also a card holding member in which the metal portion is a member formed integrally from a panel member made of metal, and the resin portion is a member formed so as to cover at least a portion of the periphery of the metal portion and so as to be integrated with the metal portion.

The present invention is also a card holding member which includes a card supporting portion supporting at least a portion of the terminal accommodating surface of the card, and the metal portion does not come into contact with the lower end of the terminal accommodating surface and the side surfaces of the card.

The present invention is also a card holding member in which the metal portion is a substantially rectangular frame member.

The present invention is also a card holding member in which the metal portion is exposed on the surface opposite the terminal accommodating surface in the front frame portion, the rear frame portion, and the side frame portions.

The present invention is also a card holding member in which the metal portion is a panel member extending in the transverse direction, and the front frame portion does not include the resin portion and is composed of the metal portion.

The present invention is also a card holding member in which the metal portion is a panel member extending in the transverse direction and the longitudinal direction, and covers at least a portion of the surface opposite the terminal accommodating surface in a card accommodating space whose periphery is defined by the front frame portion, the rear frame portion, and the side frame portions.

The present invention is also a card holding member in which at least a portion of the metal portion faces the surface opposite the terminal accommodating surface on the card.

The present invention is also a card holding member in which the card holding member is able to accommodate a plurality of cards.

The present invention is also a card connector able to receive an inserted card holding member according to the present invention, the card connector comprising an ejection lever able to make contact with the front frame portion, and a holding member for holding the side frame portions.

The present invention is able to prevent short-circuits, to prevent damage and wear, to facilitate handling, and to improve reliability.

BRIEF DESCRIPTION OF THE DRAWINGS

FIG. 1 is a pair of perspective views showing the card tray in the first embodiment of the present invention during use in which FIG. 1(a) shows the card tray inserted in a card connector while accommodating a card, and FIG. 1(b) shows the card tray inserted in a card connector without accommodating a card.

FIG. 2 is a pair of perspective views of the card tray in the first embodiment of the present invention in which FIG. 2(a) is a perspective view from above, and FIG. 2(b) is a perspective view from below.

FIG. 3 is three views of the card tray in the first embodiment of the present invention in which FIG. 3(a) is a top view, FIG. 3(b) is a rear view, and FIG. 3(c) is a side view.

FIG. 4 is a pair of perspective views of the metal portion of the card tray in the first embodiment of the present invention in which FIG. 4(b) is a perspective view from below.

FIG. 4A is a pair of perspective views of a variation on the metal portion of the card tray in the first embodiment of the present invention in which FIG. 4A (a) is a perspective view from above, and FIG. 4A (b) is a perspective view from below.

FIG. 5 is a pair of perspective views of the metal portion of the card tray coated with a resin in the first embodiment of the present invention in which FIG. 5(a) is a perspective view from above, and FIG. 5(b) is a perspective view from below.

FIG. 6 is a pair of perspective views of the card connector in the first embodiment of the present invention in which FIG. 6(a) is a view with the shell attached, and FIG. 6(b) is a view with the shell removed.

FIG. 7 is a pair of perspective views showing the card tray in the second embodiment of the present invention during use in which FIG. 7(a) shows the card tray inserted in a card connector while accommodating a card, and FIG. 7(b) shows the card tray inserted in a card connector without accommodating a card.

FIG. 8 is a pair of perspective views of the card tray in the second embodiment of the present invention in which FIG. 8(a) is a perspective view from above, and FIG. 8(b) is a perspective view from below.

FIG. 9 is a pair of perspective views used to explain how the metal portion of the card tray is coated with a resin in the second embodiment of the present invention in which FIG. 9(a) shows only the metal portion, and FIG. 9(b) shows the metal portion coated with a resin.

FIG. 10 is a pair of perspective views of the card connector in the second embodiment of the present invention in which FIG. 10(a) is a view with the shell attached, and FIG. 10(b) is a view with the shell removed.

FIG. 11 is a pair of perspective views showing the card tray in the third embodiment of the present invention during use in which FIG. 11(a) shows the card tray inserted in a card connector while accommodating a card, and FIG. 11(b) shows the card tray inserted in a card connector without accommodating a card.

FIG. 12 is a pair of perspective views of the card tray in the third embodiment of the present invention in which FIG. 12(a) is a perspective view from above, and FIG. 12(b) is a perspective view from below.

FIG. 13 is a pair of perspective views used to explain how the metal portion of the card tray is coated with a resin in the third embodiment of the present invention in which FIG. 13(a) shows only the metal portion, and FIG. 13(b) shows the metal portion coated with a resin.

FIG. 14 is a pair of perspective views showing the card tray in the fourth embodiment of the present invention during use in which FIG. 14(a) shows the card tray inserted in a card connector while accommodating a card, and FIG. 14(b) shows the card tray inserted in a card connector without accommodating a card.

FIG. 15 is a pair of perspective views of the card tray in the fourth embodiment of the present invention in which FIG. 15(a) is a perspective view from above, and FIG. 15(b) is a perspective view from below.

FIG. 17 is a pair of perspective views showing a card housed in the card tray in the fourth embodiment of the present invention in which FIG. 17(a) shows two cards of different types being housed, and FIG. 17(b) shows two cards of the same type being housed.

DETAILED DESCRIPTION OF THE PREFERRED EMBODIMENTS

The following is a detailed explanation of embodiments of the present invention with reference to the drawings.

Figure 1:
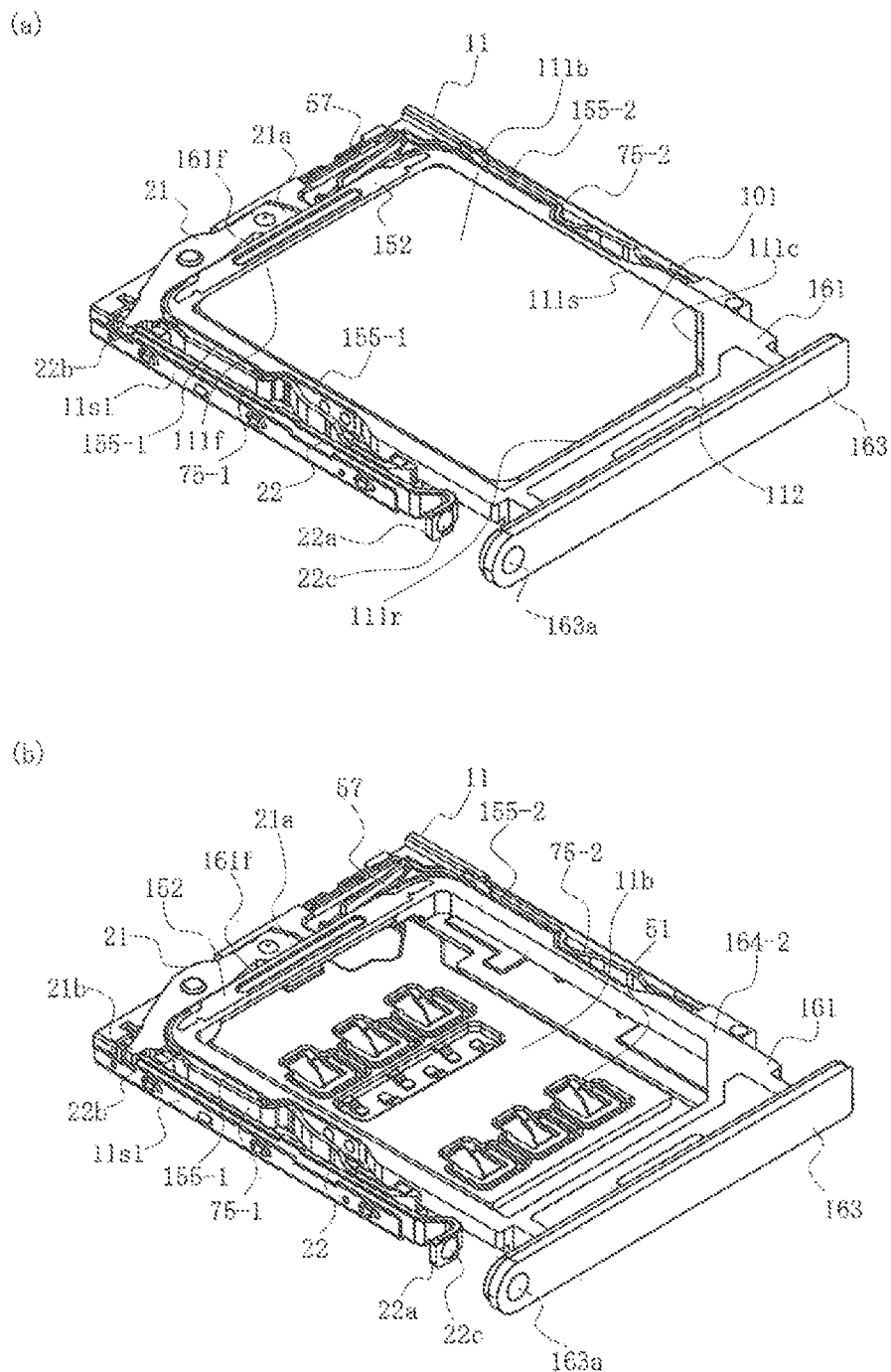
Figure 2:
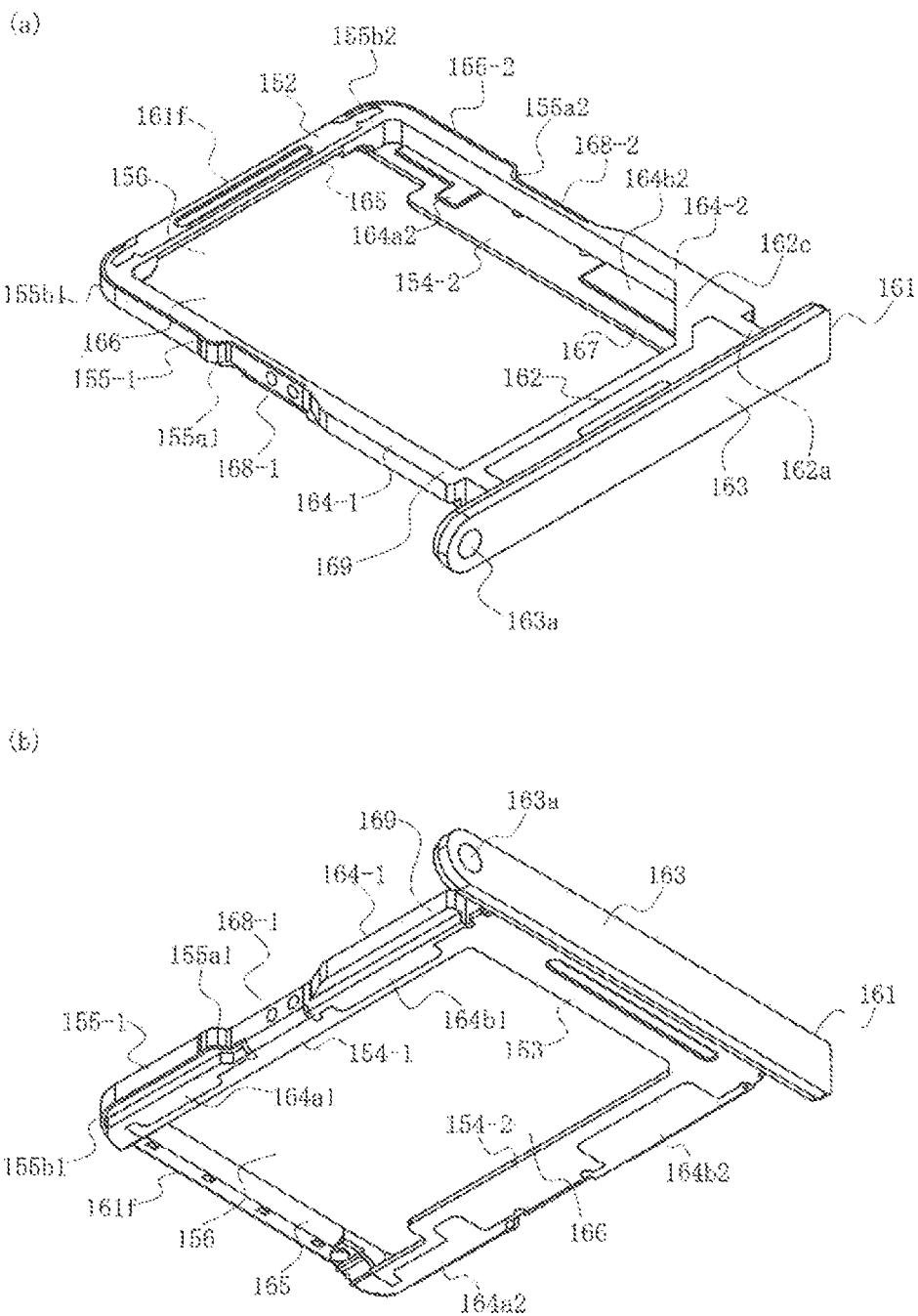
Figure 3:
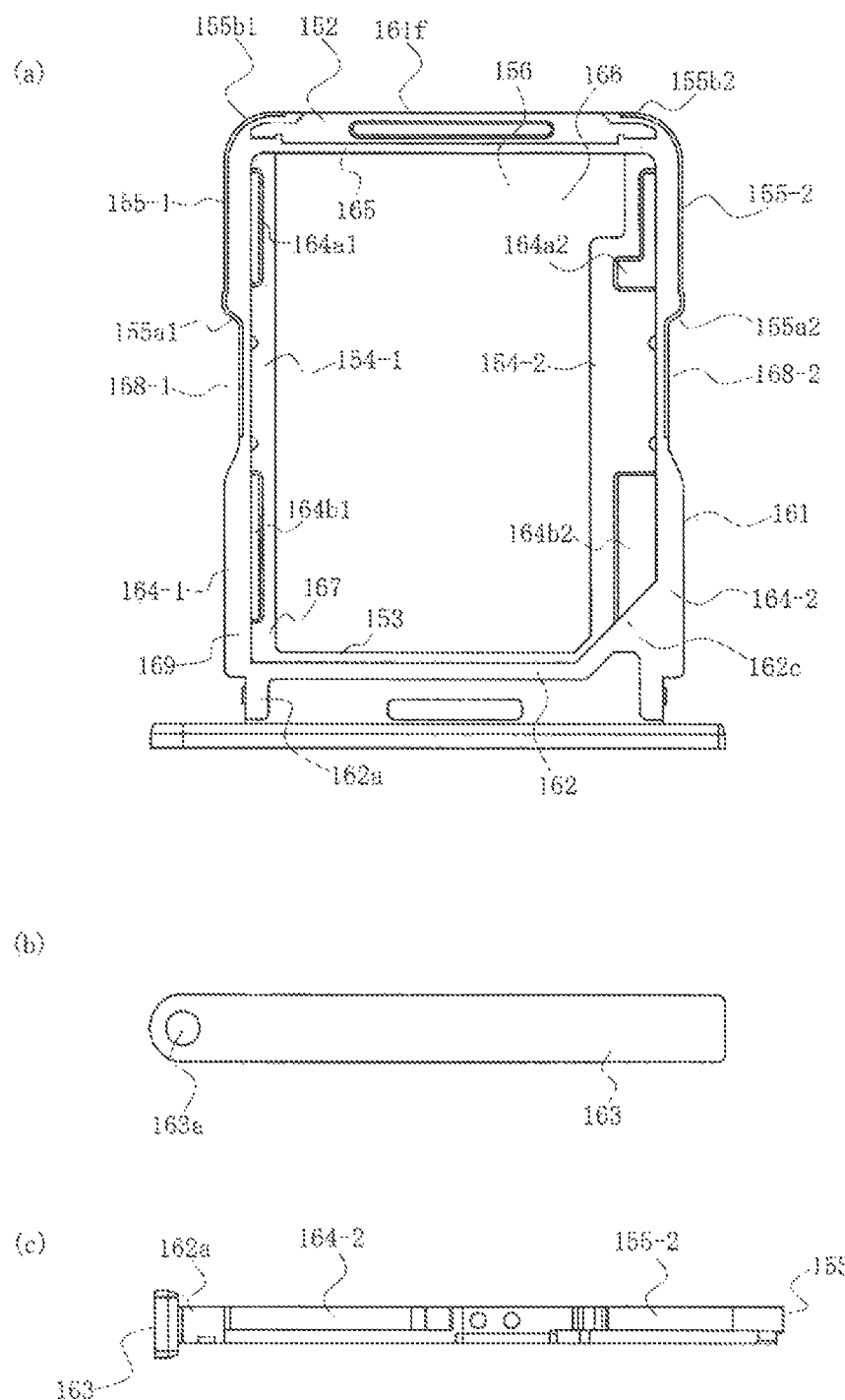
Figure 4:
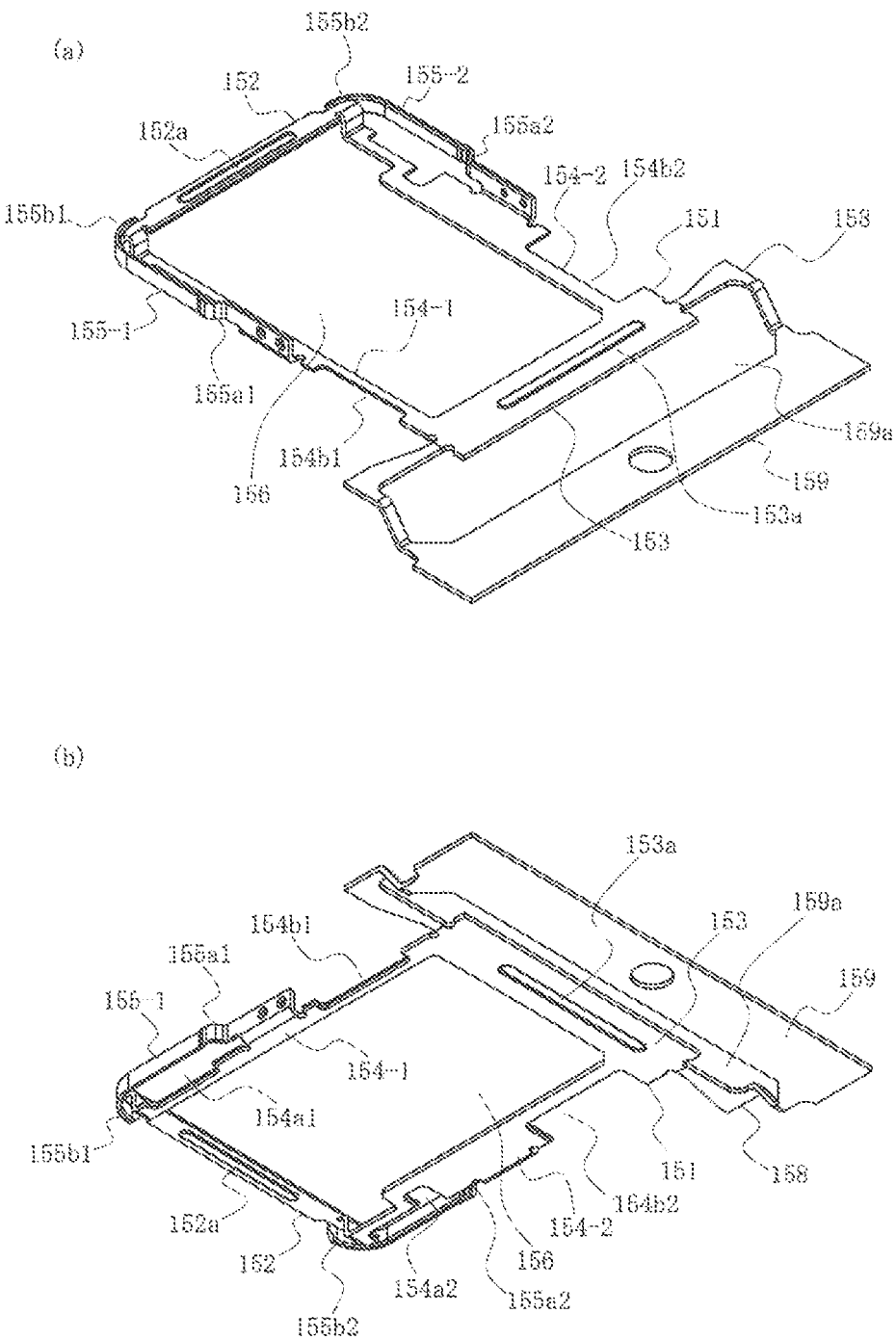
Figure 4A:
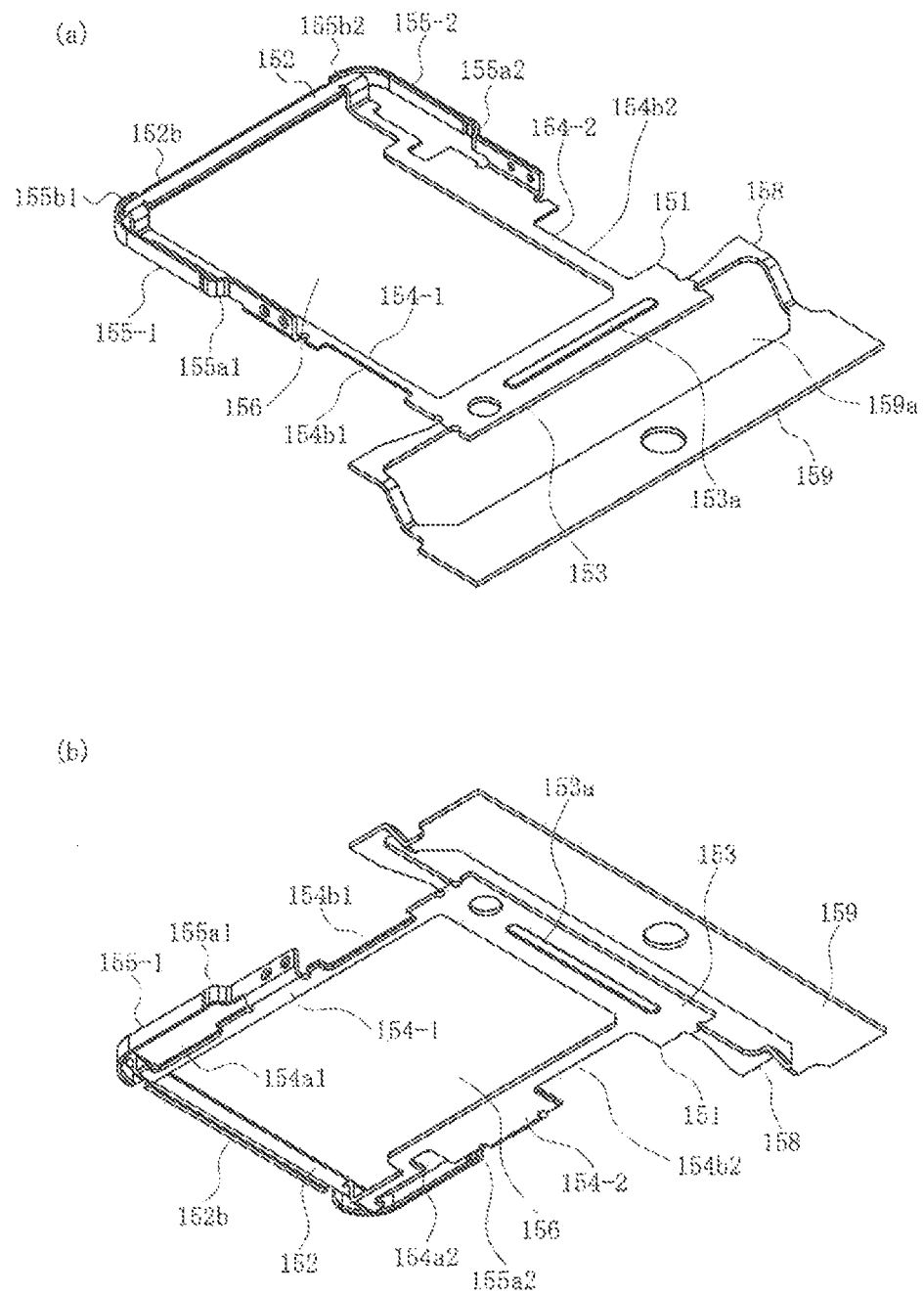
FIG. 4(a) is a perspective view from above.
Figure 5:
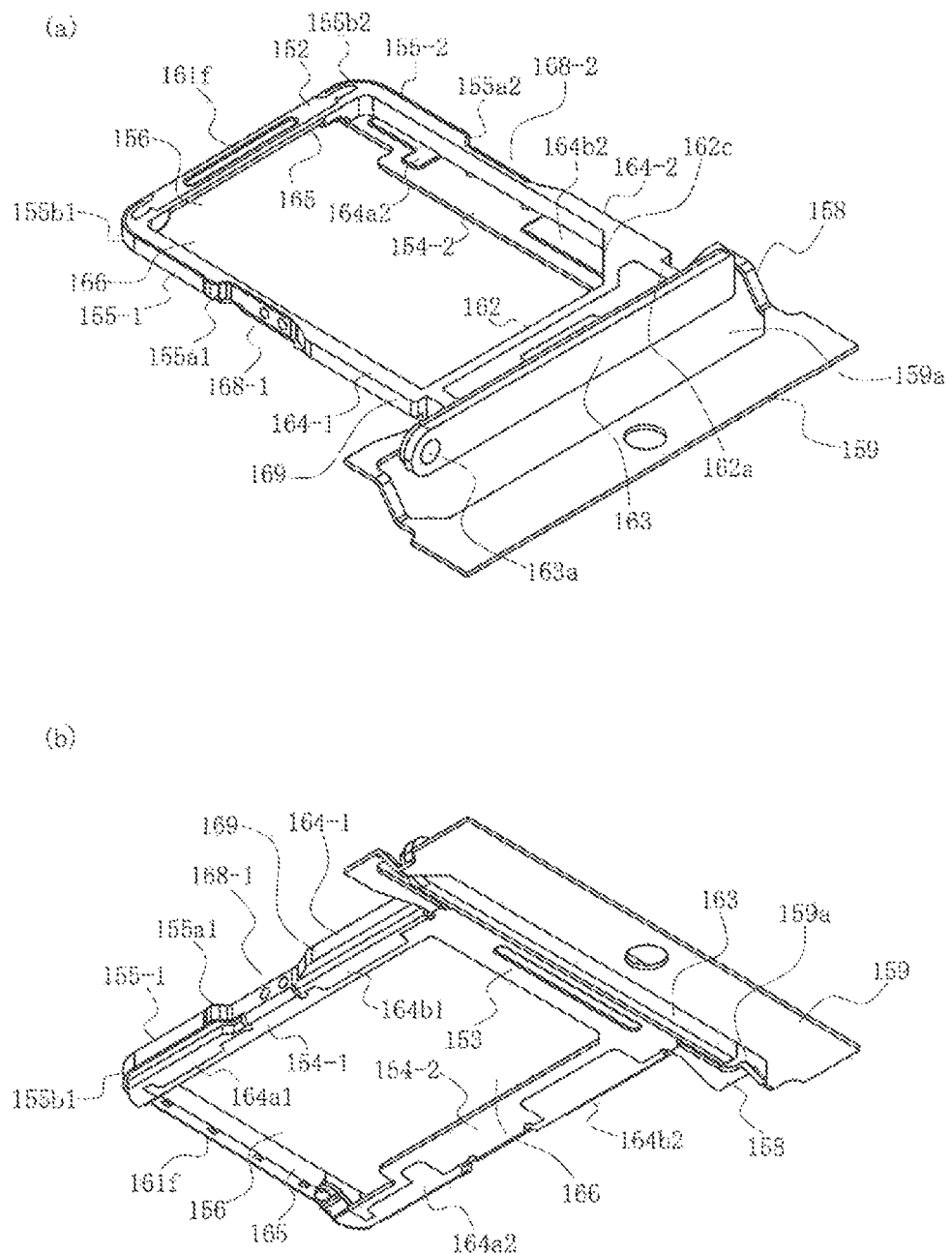
Figure 6:
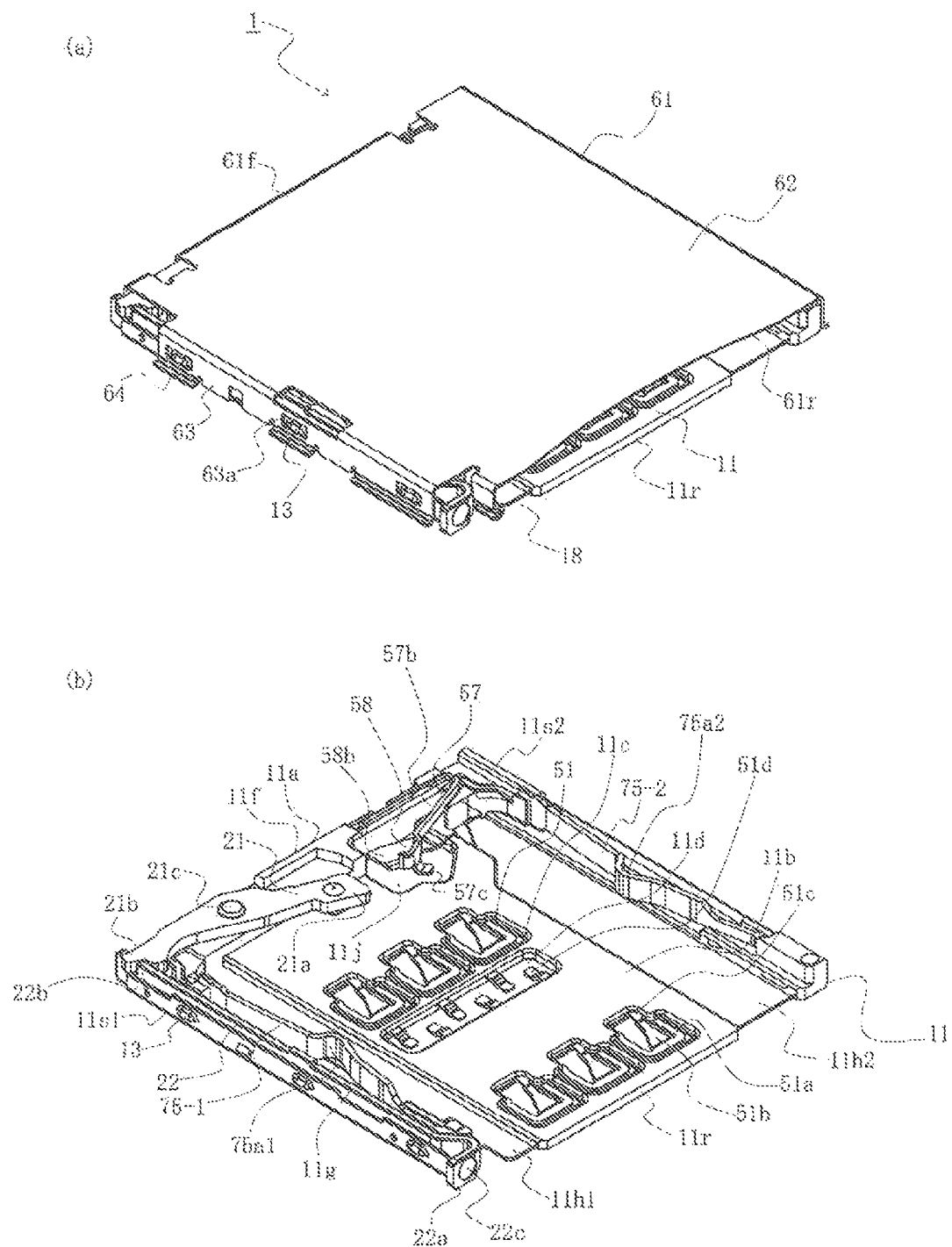

FIG. 1 is a pair of perspective views showing the card tray in the first embodiment of the present invention during use, FIG. 2 is a pair of perspective views of the card tray in the first embodiment of the present invention, FIG. 3 is three views of the card tray in the first embodiment of the present invention, FIG. 4 is a pair of perspective views of the metal portion of the card tray in the first embodiment of the present invention, FIG. 4A is a pair of perspective views of a variation on the metal portion of the card tray in the first embodiment of the present invention, FIG. 5 is a pair of perspective views of the metal portion of the card tray coated with a resin in the first embodiment of the present invention, and FIG. 6 is a pair of perspective views of the card connector in the first embodiment of the present invention. In FIG. 1, (a) shows the card tray inserted in a card connector while accommodating a card, and (b) shows the card tray inserted in a card connector without accommodating a card. In FIG. 2, (a) is a perspective view from above, and (b) is a perspective view from below. In FIG. 3, (a) is a top view, (b) is a rear view, and (c) is a side view. In FIG. 4, FIG. 4A, and FIG. 5, (a) is a perspective view from above, and FIG. 4A (b) is a perspective view from below. In FIG. 6, (a) is a view with the shell attached, and (b) is a view with the shell removed.

In the drawings, 161 is the card tray serving as the card holding member in the present embodiment. As shown in FIG. 1 (a), it is inserted into a card connector 1 (see FIG. 6(a)) mounted in an electronic device (not shown) while housing a card 101. In other words, the card 101 is accommodated inside the card tray 161 with both side surfaces 112 surrounded by the card tray 161, and is mounted in an electronic device via the card connector 1. The electronic device may be any type of device, including a personal computer, a mobile phone, a communication modem, a PDA, a digital camera, a video camera, a music player, a gaming console, or a car navigation system.

However, when a card connector other than card connector 1 is mounted in an electronic device, the user does not use card connector 1. In this case, the empty card tray 161, that is, the card tray 161 not housing the card 101, can be inserted into the card connector 1 for storage as shown in FIG. 1 (*b*). For convenience of explanation, the shell 61 of the card connector 1 is not depicted in FIG. 1.

For the sake of convenience, the card 101 can be any type of card such as a SIM card, a microSIM card, MMC® card, SD® card, miniSD® card, xD-Picture® card, Memory Stick®, Memory Stick Duo®, Smart Media®, or Trans-Flash® memory card. In the explanation of the present embodiment, the card is a 4th Form Factor (4FF) card or so-called nanoSIM card. In accordance with the ETSI TS 102 221 V11.00 card standard, the nanoSIM card has a longitudinal length of 12.3 mm, a width of 8.8 mm, and a thickness of 0.67 mm.

As shown in FIG. 1 (*a*), the card 101 has a substantially rectangular shape, and electrode pads serving as the terminal members are arranged in rows along the front end 111*f* and the rear end 111*r* on the lower surface. For example, there may be two rows of three pads each. In other words, the electrode pads are arranged in two rows extending in the transverse direction of the card 101. Electrode pads are not provided on the upper surface 111*b*, that is, on the side opposite the terminal accommodating surface. A notched portion 111*c*, which is notched on an inclined angle, is formed on either corner connecting the right or the left end of the rear end 111*r* to a side edge 111*s*.

In the present embodiment, the expressions indicating direction, such as upper, lower, left, right, front and rear, which are used to explain the configuration and operation of each portion of the card connector 1, card tray 161, and card 101, are relative and not absolute. They depend on the orientation of the connector 1, card tray 161, and card 101, and their constituent components shown in the drawings. When the orientation of the connector 1, card tray 161, and card 101 or their constituent components changes, the interpretation changes in response to the change in orientation.

Here, the card tray 161, as shown in FIG. 4, has an integrally formed metal portion 151 obtained by punching and bending a conductive metal plate, and a resin portion 169, as shown in FIG. 5, molded from an insulating resin using a molding method such as insertion molding or overmolding so as to cover and become integrated with at least a portion of the outer periphery of the metal portion 151.

A plurality of metal portions 151 are integrally formed for use in transport, and connected to the carrier portion 159 cut out in a later step. In FIG. 4 and FIG. 5, for the sake of simplicity, a single metal portion 151 is depicted, and the carrier portion 159, which is actually a long band-shaped member, is depicted as being shorter with both ends truncated.

As shown in FIG. 4, the metal portion 151 is a substantially rectangular frame member surrounding all four sides of a substantially rectangular opening 156 which is able to expose the electrode pads of the card 101. It has a rear metal frame portion 153 and a front metal frame portion 152 extending parallel to each other in the transverse direction, and a first metal side frame portion 154-1 and a second metal side frame portion 154-2 extending in the longitudinal direction and connected to both ends of the rear metal frame portion 153 and the front metal frame portion 152. When referred to collectively, the first metal side frame portion 154-1 and the second metal side frame portion 154-2 are referred to as the metal side frame portions 154.

A space portion 159*a* is formed between the rear metal frame portion 153 and the carrier portion 159, and both ends of the rear metal frame portion 153 are connected to a linear band-shaped carrier portion 159 via slender band-shaped connecting portions 158. When the carrier portion 159 is cut in a subsequent step, the connecting portions 158 are cut off at the boundary line with both ends of the rear metal frame portion 153.

The rear metal frame portion 153 is flush with the metal side frame portions 154, but the front metal frame portion 152 is positioned higher than the rear metal frame portion 153 and the metal side frame portions 154. The vertical distance in the positioning of the front metal frame portion 152 relative to the rear metal frame portion 153 and the metal side frame portions 154 is substantially equal to the thickness dimension of the card 101. There are slit-like protrusions extending in the transverse direction in the rear metal frame portion 153 and the front metal frame portion 152. These are ridge portions 153*a*, 152*a* protruding in the thickness direction of the panels. These ridge portions 153*a*, 152*a* strengthen the rear metal frame portion 153 and the front metal frame portion 152.

In the variation shown in FIG. 4A, a metal front wall portion 152*b* bent downward at a right angle to the front metal frame portion 152 is connected to the front edge of the front metal frame portion 152. This metal front wall portion 152*b* strengthens the front metal frame portion 152. Here, the front end 161*f* of the card tray 161, that is, the front surface of the metal front wall portion 152*b* is exposed to the front end of a front frame portion 165 (described in detail later).

Also, a first metal side wall portion 155-1 and a second metal side wall portion 155-2 bent at a right angle to the first metal side frame portion 154-1 and a second metal side frame portion 154-2 are connected, respectively, to the outer edge of the first metal side frame portion 154-1 and the second metal side frame portion 154-2. The first metal side wall portion 155-1 and the second metal side wall portion 155-2 are slender band-shaped members extending forward in the longitudinal direction of the first metal side frame portion 154-1 and the second metal side frame portion 154-2. The first metal side wall portion 155-1 and the second metal side wall portion 155-2 include, respectively, a first side wall tiered portion 155*a*1 and a second side wall tiered portion 155*a*2 formed in the middle, and a first front end corner portion 155*b*1 and a second front end corner portion 155*b*2 formed on the front end. The first front end corner portion 155*b*1 and the second front end corner portion 155*b*2 cover the front of both ends of the front metal frame portion 152. The upper surfaces of the first front end corner portion 155*b*1 and the second front end corner portion 155*b*2 are substantially flush with the upper surface of the front metal frame portion 152.

When referred to collectively, the first metal side wall portion 155-1 and the second metal side wall portion 155-2 are referred to as the metal side wall portions. When referred to collectively, the first side wall tiered portion 155*a*1 and the second side wall tiered portion 155*a*2 are referred to as the side wall tiered portions. When referred to collectively, the first front end corner portion 155*b*1 and the second front end corner portion 155*b*2 are referred to as the front end corner portions.

A first front side frame recessed portion 154*a*1 and a second front side frame recessed portion 154*a*2 as well as a first rear side frame recessed portion 154*b*1 and a second rear side frame recessed portion 154*b*2 are formed on the outer edges of the first metal side frame portion 154-1 and the second metal side frame portion 154-2. The outer side ends of the first rear side frame recessed portion 154*b*1 and the second rear side frame recessed portion 154*b*2 are defined by the first metal side wall portion 155-1 and the second metal side wall portion 155-2. The first front side frame recessed portion 154*a*1 and a second front side frame recessed portion 154*a*2 are sometimes referred to collectively as the front side frame recessed portions, and the rear side frame recessed portion 154*b*1 and the second rear side frame recessed portion 154*b*2 are sometimes referred to collectively as the rear side frame recessed portions. The front side frame recessed portion and the rear side frame recessed portion are sometimes referred to collectively as the side frame recessed portions.

Then, at least a portion of the periphery of the metal portion 151, as shown in FIG. 5, is integrally coated with an insulating resin using a molding method such as insert molding or overmolding, and the carrier portion 159 is notched to obtain the card tray 161 shown in FIG. 2 and FIG. 3. The card tray 161 is a substantially rectangular frame member surrounding all four sides of a space portion 166 serving as the card accommodating space for accommodating the card 101, and has a rear frame portion 162 and a front frame portion 165 extending parallel to each other in the transverse direction, and a first side frame portion 164-1 and a second side frame portion 164-2 extending in the longitudinal direction and connected to both ends of the rear frame portion 162 and the front frame portion 165. When referred to collectively, the first side frame portion 164-1 and the second side frame portion 164-2 are referred to as the side frame portions. In other words, the space portion 166 is defined by the front frame portion 165, the rear frame portion 162, and the side frame portions 4-64.

An inclined portion 162*c* is formed in a corner at which the second side frame portion 164-2 is connected to the rear frame portion 162, that is, in the rear right corner. The inclined portion 162*c* functions as a card orientation regulating portion. When the card 101 is inserted with the proper orientation as shown in FIG. 1 (*a*), it allows the card 101 to be inserted into the card tray 161. However, when the card 101 does not have the proper orientation, it does not allow the card 101 to be inserted into the card tray 161. In other words, it does not allow the card 101 to be housed in the space portion 166. More specifically, the inclined portion 162*c* is formed so that it faces the notched portion 111*c* in the card 101 allowing the card to be housed inside the space portion 166 in the proper orientation. Therefore, the card 101 with an improper orientation, either upside down or backwards, cannot be housed inside the space portion 166 of the card tray 161.

A rear panel portion 163 is connected via a coupling portion 162*a* to the rear of the rear frame portion 162. The dimension of the rear panel portion 163 in the thickness direction of the card tray 161 (in the vertical direction in FIG. 3 (*c*)) is greater than that of the rear frame portion 162, the front frame portion 165, and the side frame portion. Both ends of the rear panel portion 163 protrude outward in the transverse direction of the card tray 161 from the rear frame portion 162 and the front frame portion 165. In this way, the rear panel portion 163 is designed to stop erroneous insertion when the card tray 161 is inserted into the card connector 1 upside down. It also allows for easier handling and operation when the user of the card connector 1 inserts the card tray 161 manually. A through-hole 163*a* is also formed in both ends of the rear panel portion 163 which passes through the rear panel portion 163 in the thickness direction of the panel. Each through-hole 163*a* is a hole passing through an auxiliary member when the operating unit 22*a* of the push rod 22 (see FIG. 1) of the card connector 1 is used to apply pressure via the auxiliary member, which can be a pin or a rod.

With the exception of the rear panel portion 163, the upper surfaces of the rear frame portion 162, the side frame portions, and the front frame portion 165 are flush with each other (the surface opposite the lower surface of the card 101 serving as the terminal accommodating surface. An eaves portion 167 protrudes into the space portion 166 from the inner bottom end of the rear frame portion 162 and the left and right side frame portions. The eaves portions 167 function as card supporting portions for supporting at least some of the lower surface of the card 101 housed inside the space portion 166, such as near the side edges.

More than half the surface area of the eaves portions 167 is taken up by the rear metal frame portion 153, the first metal side frame portion 154-1, and the second metal side frame portion 154-2 of the metal portion 151. However, the portions of the first metal side frame portion 154-1 and the second metal side frame portion 154-2 corresponding to the first front side frame recessed portion 154*a*1 and the second front side frame recessed portion 154*a*2 as well as the first rear side frame recessed portion 154*b*1 and the second rear side frame recessed portion 154*b*2 is filled with an insulating resin to form first front island portion 164*a*1 and second front island portion 164*a*2 and first rear island portion 164*b*1 and second rear island portion 164*b*2.

The lower surfaces of the first front island portion 164*a*1, second front island portion 164*a*2, first rear island portion 164*b*1, and second rear island portion 164*b*2 (on the same side as the terminal accommodating surface of the card 101) are flush with the lower surfaces of the rear metal frame portion 153, the first metal side frame portion 154-1, and the second metal side frame portion 154-2. The upper surfaces of the first front island portion 164*a*1, second front island portion 164*a*2, first rear island portion 164*b*1, and second rear island portion 164*b*2 are higher than the upper surfaces of the rear metal frame portion 153, the first metal side frame portion 154-1, and the second metal side frame portion 154-2. Therefore, the electrode pads on the lower surface of the card 101 housed inside the space portion 166 make contact with the upper surfaces of the first front island portion 164*a*1, second front island portion 164*a*2, first rear island portion 164*b*1, and second rear island portion 164*b*2 made of an insulating resin, but not that of the rear metal frame portion 153, first metal side frame portion 154-1, and second metal side frame portion 154-2 made of metal.

In the explanation below, the first front island portion 164*a*1 and second front island portion 164*a*2 are sometimes referred to collectively as the front island portions 164*a*, the first rear island portion 164*b*1 and the second rear island portion 164*b*2 are sometimes referred to collectively as the rear island portions 164*b*, and the front island portions 164*a* and the rear island portions 164*b* are sometimes referred to collectively as the island portions 164*a* b.

The upper surface of the front metal frame portion 152 is exposed on the upper surface of the front frame portion 165, but the section with the metal portion 151 including the front metal frame portion 152 is not exposed on the lower surface of the front frame portion 165. The side surfaces of the rear frame portion 162, the side frame portion, and the front frame portion 165 facing into the space portion 166, that is, the inner side surfaces, are all coated with an insulating resin, and the metal portion 151 is not exposed. Therefore, the metal portion 151 does not establish any contact even though the peripheral edges of the electrode pads on the lower surface of the card 101 housed inside the space portion 166 are exposed to the side surfaces 112 of the card 101 (the surfaces connecting the lower surface and the upper surface 111b and extending in the direction orthogonal to the lower surface and the upper surface 111b).

A first holding recessed portion 168-1 and a second holding recessed portion 168-2 are formed, respectively, on the outer surfaces of the first side frame portion 164-1 and the second side frame portion 164-2 to hold the card tray 161 inside the card connector 1. The first metal side wall portion 155-1 and the second metal side wall portion 155-2 are exposed, respectively, in the first holding recessed portion 168-1 and the second holding recessed portion 168-2 at least on the front end. The section in front of the first holding recessed portion 168-1 and the second holding recessed portion 168-2 formed on the outer surfaces of the first side frame portion 164-1 and the second side frame portion 164-2, and the first metal side wall portion 155-1 and the second metal side wall portion 155-2 on both front ends of the front frame portion 165 are also exposed. The dimension of the first metal side wall portion 155-1 and the second metal side wall portion 155-2 in the thickness direction of the card tray 161 is at least greater than half of the dimension of the outer side surfaces of the first side frame portion 164-1, the second side frame portion 164-2, and the front frame portion 165.

The first side wall tiered portion 155a1 and the second side wall tiered portion 155a2 are exposed on the front end of the first holding recessed portion 168-1 and the second holding recessed portion 168-2, and the first front end corner portion 155b1 and the second front end corner portion 155b2 is exposed on the outer surface of the section connecting the first side frame portion 164-1 and the second side frame portion 164-2 to both ends of the front frame portion 165.

When a card tray 161 is inserted into the card connector 1, the spots making contact with the first holding member 75-1 and the second holding member 75-2 are covered by the first metal side wall portion 155-1 and the second metal side wall portion 155-2. As a result, the card tray 161 does not become worn out or damaged even after repeated insertion and ejection of the card tray 161 from the card connector 1 and even after making repeated sliding contact with the first holding member 75-1 and the second holding member 75-2.

When viewed from the front, the first side frame portion 164-1 and the second side frame portion 164-2 protrude below the front frame portion 165 at both ends of the front frame portion 165. In other words, the card connector 161 has a substantially downward-facing bracket-shaped profile when viewed from the front. This downward-facing bracket-shaped profile prevents erroneous insertion when the card tray 161 is inserted into the card connector 1 backwards. The lower surface of the front frame portion 165 is preferably positioned above the lower surface of the card 101 housed and held inside the space portion 166. When the card tray 161 is inserted into the card connector 1, the front frame portion 165 makes contact with the terminals 51, but the terminals 51 are not significantly displaced downwardly. As shown in FIG. 2 (b), the inner surface of the front frame portion 165 is preferably curved towards the lower surface of the front frame portion 165 and forward. In this way, when a card tray 161 is removed from the card connector 1, the contact portions 51c of the terminals 51 come into contact with the curved inner surface of the front frame portion 165 and are displaced downwardly, thereby keeping the terminals 51 from becoming deformed.

The front end 161f of the card tray 161 is exposed to the front end of the front metal frame portion 152 at the front end of the front frame portion 165. In this way, when the card tray 161 is inserted into the card connector 1, the front end of the front metal frame portion 152 is exposed where it comes into contact with the acting point portion 21a of the ejection lever 21 and the free end of the main body portion 57b of the first contact member 57. Therefore, the card tray 161 does not become worn out or damaged even after repeated insertion and ejection of the card tray 161 from the card connector 1 and even after making repeated sliding contact with the acting point portion 21a of the ejection lever 21 and the free end of the main body portion 57b of the first contact member 57.

Because, as mentioned above, the lower surfaces of the first front island portion 164a1, the second front island portion 164a2, the first rear island portion 164b1, and the second rear island portion 164b2 are flush with the lower surface of the first metal side frame portion 154-1 and the second metal side frame portion 154-2, when the card tray 161 is inserted into the card connector 1, the upper surfaces of the first flange portion 11h1 and the second flange portion 11h2 of the housing 11 come into contact with the lower surfaces of the first metal side frame portion 154-1 and the second metal side frame portion 154-2. Therefore, the card tray 161 does not become worn out or damaged even after repeated insertion and ejection of the card tray 161 from the card connector 1 and even after making repeated sliding contact with upper surfaces of the first flange portion 11h1 and the second flange portion 11h2 of the housing 11.

In the present embodiment, as shown in FIG. 6, the card connector 1 has a housing 11 integrally molded from an insulating material such as a synthetic resin, and a shell 61 or cover member formed integrally by punching and bending a conductive metal sheet which is attached to the upper side of the housing 11. The shell 61 covers at least some of the upper portion of the card tray 161 inserted into the housing 11 and the card connector 1. The card connector 1 has a substantially flat three-dimensional rectangular shape. It is mounted in an electronic device and has an insertion slot 18 in the rear (the lower right in FIG. 6(a)) for receiving an inserted card tray 161 into the housing 11. More specifically, the card tray 161 is inserted into the card insertion space formed between the housing 11 and the shell 61.

As shown in FIG. 6(b), the housing 11 has a bottom wall portion 11b which is a substantially rectangular plate-like member, and an inner wall portion 11a rising from the bottom wall portion 11b and extending along the front end portion 11f of the housing 11, that is, along the front end portion in the insertion direction of the card tray 161. The rear end portion of the housing 11 in the insertion direction of the card 161 is referred to as the rear end portion 11r.

Here, the bottom wall portion 11b has a terminal holding recessed portions 11c for holding the terminals 51. The terminal holding recessed portions 11c are openings passing through the bottom wall portion 11b in the thickness direction, and are arranged in parallel rows that extend in the transverse direction of the housing 11. In the example shown in the drawing, there are two rows of three openings each. In other words, the terminal holding recessed portions 11c and the terminal 51 held in each of the terminal holding recessed portions 11c are arranged so as to form two rows that extend in the transverse direction of the housing 11.

A section of the base portion 51a of each terminal 51 is embedded in the bottom wall portion 11b and the rest of the terminal is exposed inside the terminal holding recessed portion 11c. More specifically, the terminals 51 are embedded and held inside the bottom wall portion 11b by setting the terminals 51 inside a housing 11 formed using a molding method such as insert molding or overmolding, and then filling the cavity with the insulating material used to form the bottom wall portion 11b so that at least some of the base portion 51a of each terminal is covered by the insulating material.

Each terminal 51 has cantilevered contact arm portion 51b connected at the base end to the base portion 51a, and a contact portion 51c connected to the tip or free end of the contact arm portion 51b. At least the upper surface of the contact portion 51c is higher than the upper surface of the bottom wall portion 11b when a card 101 housed in a card tray 161 has not been inserted into the card insertion space. The portion of each terminal 51 including the contact arm portion 51b and the contact portion 51c has a side surface which rises closer to the front end portion 11f, that is extends forward at an angle. The contact arm portion 51b and the contact portion 51c are inside a terminal holding recessed portion 11c when viewed from above. The contact portion 51c of each terminal 51 is arranged so as to come into contact with an electrode pad on the card 101 in the card tray 161 inserted into the card connector 1. Therefore, the number and arrangement of terminals 51 has to be changed to match the number and arrangement of electrode pads on the card 101.

Also, a solder tail opening 11d is formed in the bottom wall portion 11b which passes through in the thickness direction. The solder tail portion 51d is exposed in the solder tail opening 11d as the base connecting portion of each terminal 51. Each solder tail portion 51d is connected to the base portion 51a of each terminal 51 via a coupling portion (not shown) embedded in the bottom wall portion 11b. Each solder tail portion 51d is then connected electrically via solder to a terminal member such as a signal line, contact pad, or terminal formed on the circuit board of the electronic device.

The housing 11 has a first side wall portion 11s1 and a second side wall portion 11s2 extending in the longitudinal direction along the side edges, and a tray ejecting rod housing portion 11g is formed inside the first side wall portion 11s1. There is an ejection mechanism in the tray ejecting rod housing portion 11g for ejecting a card tray 161 inserted into the connector 1, and a push rod 22 serving as the tray ejection operation member is slidably mounted therein. Push rod 22 can slide in the longitudinal direction along the first side wall portion 110. The first side wall portion 11s1 and the second side wall portion 11s2 are sometimes referred to collectively below as the side wall portions 11s.

The push rod 22 is a substantially linear rod-shaped or band-shaped member which has a bent operating unit 22a in the rear end portion protruding from the housing 11. The operating unit 22a has a shape that is easy to operate when the user manually manipulates the card connector 1 via a pin, rod, or other auxiliary member. A recessed portion 22c may be formed in the rear surface of the operating unit 22a so as to conform better to the tip of the pin, rod, or other auxiliary member.

An engaging portion 22b is formed in the front end portion of the push rod 22 to engage the force input portion 21b of the ejection lever 21. The ejection lever 21, which is the tray ejecting lever in the tray ejection mechanism, is a lever-shaped member arranged near the inner wall portion 11a. As a result, the ejection lever 21 is mounted on the bottom wall portion 11b so as to pivot on the fulcrum portion 21c. The end portion of the ejection lever 21 opposite the force input portion 21b with the fulcrum portion 21c between them makes contact with the front end 161f of the card tray 161 inserted into the card connector 1, and functions as the acting point portion 21a imparting force to the card tray 161 in the ejection direction.

A first holding member 75-1 functioning as a holding spring for holding the card tray 161 inserted into the card connector 1 is housed inside the tray ejection rod accommodating portion 11g inside the first side wall portion 11s1. A second holding member 75-2 functioning as a holding spring for holding the card tray 161 inserted into the card connector 1 is also housed inside the second side wall portion 11s2. The first holding member 75-1 and the second holding member 75-2 are metal bands with spring action, and a first holding protrusion 75a1 and a second holding protrusion 75a2 protrude inward in the transverse direction of the housing 11. The first holding member 75-1 and the second holding member 75-2 are sometimes referred to collectively below as the holding members 75, and the first holding protrusion 75a1 and the second holding protrusion 75a2 are sometimes referred to collectively below as the holding protrusions 75a.

The shell 61 has a substantially rectangular ceiling panel portion 62 and side panel portions 63 erected on the side edges of the ceiling panel portion 62. A plurality of engaging openings 63a are formed in the side panel portions 63. When the shell 61 is mounted on the housing 11 from above, these engaging openings 63a engage the engaging protrusions 13 formed on the outer walls of the side wall portions 11s of the housing 11 to secure the shell 61 to the housing 11. The side panel portions 63 are erected at spots on the lower end of the side panel portions 63, and a solder tail 64 is formed as a substrate connecting portion which extends outward in the transverse direction of the shell 61. The solder tail portion 64 is secured by soldering to an anchoring pad formed on the surface of the printed circuit board in the electronic device. The front and rear end portions of the shell 61 in the insertion direction of the card tray 161 are referred to as the front end portion 61f and the rear end portion 61r.

The card connector 1 also has a detection switch terminal for detecting a card tray 161 that has been inserted into the card connector 1. More specifically, a tray detection switch terminal is arranged near the front end portion of the housing 11 to detect the insertion of a card tray 161 to a predetermined position inside the card connector 1 (the position at which the card tray 161 is held by the holding members 75 and reliable contact has been established with the contact portions 51c of the terminals 51 corresponding the electrical pads when a card 101 is housed inside the card tray 161). The tray detection switch has a first contact member 57, which is a cantilevered terminal attached at or near the front end portion 11f, and a second contact member 58, which is a terminal held by a switch holding recessed portion 11j formed in the bottom wall portion 11b. The switch holding recessed portion 11j is an opening passing through the bottom wall portion 11b in the thickness direction.

The first contact member 57 has a cantilevered main body portion 57b extending in the horizontal direction and connected to a mounting portion on the front end portion 11f and a contact portion 57c connected to the free end, that is, the tip of the main body portion 57b. The main body portion 57b extends on an incline relative to the inner wall portion 11a and the contact portion 57c extends to the rear, that is, towards the rear end portion 11r when a card tray 161 has not been inserted into the card connector 1. When a card tray 161 has been inserted, the front frame portion 165 of the card tray 161 comes into contact with the free end of the main body portion 57b. The second contact member 58 has a mounting portion embedded in the bottom wall portion 11b, and a contact portion 58b connected to the mounting portion and exposed at least on the tip or the free end inside the switch holding recessed portion 11j.

When a card tray 161 has not been inserted, as shown in FIG. 6(b), the contact portion 57c of the first contact member 57 does not come into contact with the contact portion 58b of the second contact member 58. When the first contact member 57 does not come into contact with the second contact member 58, that is, when the terminals do not come into contact, the tray detection switch remains unelectrified, that is, turned OFF. However, when a card tray 161 has been inserted into the card connector 1 and has reached a predetermined position, the front frame portion 165 of the card tray 161 presses down and displaces the free end of the main body portion 57b of the first contact member 57 in the direction of the front end portion 11f, and the contact portion 57c of the first contact member 57 comes into contact with the contact portion 58b of the second contact member 58. In this way, the first contact member 57 and the second contact member 58 come into contact, the terminals come into contact with each other, and the tray detection switch is electrified and turned ON. Thus, the card tray 161 reaching the predetermined position in the card connector 1 is detected.

The housing 11 has a first flange portion 11h1 and a second flange portion 11h2 extending from the left and right sides of the bottom wall portion 11b to the outside in the transverse direction. The first flange portion 11h1 and the second flange portion 11h2 are panel members that are thinner than the bottom wall portion 11b and the lower surfaces of the flange portions are flush with the lower surface of the bottom wall portions 11b. Thus, the upper surfaces of the first flange portion 11h1 and the second flange portion 11h2 are positioned below the upper surface of the bottom wall portion 11b. As a result, the shape of the insertion port 18 formed between the rear end portion 11r of the housing 11 and the rear end portion 61r of the shell 61 is slender and rectangular and has a constant thickness in the transverse direction. It also has downward protrusions at both ends to give it a downward-facing bracket-shaped profile.

Because the card tray 161 has a downward-facing bracket-shaped profile, the insertion port 18 prevents erroneous insertion when the card tray 161 is inserted into the card connector 1 upside down. The first flange portion 11h1 and the second flange portion 11h2 are sometimes referred to collectively below as the flange portions 11h.

The dimension of the insertion slot 18 in the thickness direction is smaller than the dimension of the rear panel portion 163 of the card tray 161 in the thickness direction. Also, the dimension of the insertion slot 18 in the transverse direction is smaller than the thickness direction of the rear panel portion 163 of the card tray 161 in the transverse direction. The insertion slot 18 works with the rear panel portion 163 to prevent erroneous insertion when the card tray 161 is inserted backwards into the card connector 1.

The following is an explanation of the operation of a card connector 1 with this configuration. First, the operations associated with insertion of the card tray 161 will be explained.

First, the user manually inserts a card tray 161 housing a card 101 into the card insertion space between the housing 11 and the shell 61 from the insertion slot 18 in the rear of the card connector 1.

Here, the card connector 161 is inserted properly, that is, the upper surface is facing upward, that is, facing the ceiling panel portion 62 of the shell 61, and the front frame portion 165 is facing the front end portion 61f of the shell 61. Therefore, when the card 101 is housed inside the card tray 161, the lower surface with the electrode pads is exposed and facing downwards, the terminals 51 are facing the bottom wall portion 11b of the housing 11, and the front end 111f is facing the front end portion 61f of the shell 61.

When the card tray 161 is inserted via the insertion slot 18 into the card insertion space formed between the housing 11 and the shell 61, the card tray 161 enters the card insertion space with the lower surfaces of the first metal side panel portion 154-1 and the second metal side panel portion 154-2 approaching or making contact with the upper surface of the first flange portion 11h1 and the second flange portion 11h2. Because the lower surface of the front frame portion 165 is higher than the lower surface of the card 101 housed inside the space portion 166, when a card tray 161 is inserted into the card insertion space, the contact portion 51c of each terminal 51 comes into contact with the front frame portion 165, but the terminals 51 only become slightly displaced downwards.

Next, when the user pushes in the card tray 161, the first holding protrusion 75a1 and the second holding protrusion 75a2 on the first holding member 75-1 and the second holding member 75-2 come into contact with the card tray 161. More specifically, the first holding protrusion 75a1 and the second holding protrusion 75a2 nearly simultaneously come into contact with the first front end corner portion 155b1 and the second front end corner portion 155b2 exposed to the outer surface of the section connecting the first side frame portion 164-1 and the second side frame portion 164-2 to both ends of the front frame portion 165.

Next, when the user pushes in the card tray 161, the first holding member 75-1 and the second holding member 75-2 are elastically displaced, the interval between the first holding protrusion 75a1 on the first holding member 75-1 and the second holding protrusion 75a2 on the second holding member 75-2 are pushed apart, and the first holding protrusion 75a1 and the second holding protrusion 75a2 slide along the first metal side wall portion 155-1 and the second metal side wall portion 155-2 exposed on the outer surface of the first side frame portion 164-1 and the second side frame portion 164-2, and move to the rear of the card tray 161 in a relative sense.

The first contact member 57 makes contact with the card tray 161. The ejection lever 21 also makes contact with the card tray 161. More specifically, the front end of the front metal frame portion 152 and the periphery thereof exposed to the front end of the front frame portion 165 come into contact with the free end of the main body portion 57b and the first contact member 57 and the acting point portion 21a of the ejection lever 21.

Next, when the user pushes in the card tray 161 even further, the card tray 161 reaches the predetermined position in the card connector 1 as shown in FIG. 1. At this time, the front frame portion 165 is pressed against, the free end of the main body portion 57b of the first contact member 57 is displaced in the direction of the front end portion 11*f*, and the contact portion 57*c* of the first contact member 57 comes into contact with the contact portion 58*b* of the second contact member 58. In this way, the first contact member 57 and the second contact member 58 come into contact with each other, the tray detection switch is turned ON, and the card tray 161 reaching the predetermined position in the card connector 1 is detected.

When the card tray 161 moves beyond the predetermined position in the card connector 1, the acting point portion 21*a* presses against the front frame portion 165 and is displaced in the direction of the front end portion 11*f*, and the force input portion 21*b* of the ejection lever 21 is displaced in the direction of the rear end portion 11*r*. As a result, the push rod 22 equipped with an engaging portion 22*b* for engaging the force input portion 21*b* slides in the direction of the rear end portion 11*r*, and the amount by which the operating unit 22*a* protruded from the housing 11 is greater than the initial state shown in FIG. 6.

When the card tray 161 reaches the predetermined position in the card connector 1, the first holding protrusion 75*a*1 and the second holding protrusion 75*a*2 of the first holding member 75-1 and the second holding member 75-2 enter and engage the first holding recessed portion 168-1 and the second holding recessed portion 168-2 formed on the outside surfaces of the first side frame portion 164-1 and the second side frame portion 164-2. More specifically, the first holding protrusion 75*a*1 and the second holding protrusion 75*a*2 engage the first side wall tiered portion 155*a*1 and the second side wall tiered portion 155*a*2 of the first metal side wall portion 155-1 and the second metal side wall portion 155-2 exposed on the front ends of the first holding recessed portion 168-1 and the second holding recessed portion 168-2. In this way, the card tray 161 is locked at the predetermined position inside the card connector 1. Because it is grasped elastically on the left and right by the first holding member 75-1 and the second holding member 75-2, displacement in the transverse direction of the card tray 161 is restricted.

When the card 101 is housed inside the card tray 161, the card 101 along with the card tray 161 is held in the predetermined position so that data can be exchanged with a computing means in the electronic device containing the card connector 1. When the card 101 is held in the predetermined position, the contact portions 51*c* of the terminals 51 on the card connector 1 make contact and establish an electrical contact with the electrode pads on the card 101.

The following is an explanation of the operations associated with ejecting the card tray 161 from the card connector 1.

First, when the user manually pushes the operating unit 22*a* of the push rod 22 via an auxiliary member such as a pin or rod, the force input portion 21*b* of the ejection lever 21 engaging the engaging portion 22*b* of the push rod 22 is displaced in the direction of the front end portion 11*f*. When an auxiliary member is used, the auxiliary member is inserted into the through-hole 163*a* in the rear panel portion 163, the tip of the auxiliary member engages the recessed portion 22*c* of the operating unit 22*a*, and the operating unit 22*a* is pushed via the auxiliary member.

In this way, the front frame portion 165 is pushed into the acting point portion 21*a* of the ejection lever 21, and the card tray 161 is displaced from the predetermined position in the direction of the rear end portion 11*r*. At this time, the card tray 161 is locked because the first holding protrusion 75*a*1 and the second holding protrusion 75*a*2 of the first holding member 75-1 and the second holding member 75-2 are engaged with the first side wall tiered portion 155*a*1 and the second side wall tiered portion 155*a*2 of the first metal side wall portion 155-1 and the second metal side wall portion 155-2. However, the force exerted by the user's fingers is greater, so when the user pushes in the operating unit 22*a* of the push rod 22, the card tray 161 is easily unlocked and displaced in the direction of the rear end portion 11*r*.

The rear panel portion 163 of the card tray 161 then protrudes sufficiently from the insertion slot 18 of the card connector 1. As a result, the user can grasp the rear panel portion 163 with the fingers, and pull out and remove the card tray 161 from the card connector 1.

In the present embodiment, a single card 101 is housed inside the card tray 161. However, the card tray 161 can house a plurality of cards 101 inside the space portion 166 in the same manner as the fourth embodiment described below.

In the present embodiment, the card tray 161 included a front frame portion 165 and a rear frame portion 162 extending in the transverse direction, and side frame portions connecting both ends of the front frame portion 165 and both ends of the rear frame portions 162. In this way, the side walls 112 of a card 101 including electrode pads on the lower surface are surrounded. The card tray 161 also includes a metal portion 151 and a resin portion 169, and at least some of the metal portion 151 is exposed on the front end of the front frame portion 165.

In this way, the card tray 161 does not cause a short circuit even when it comes into contact with the electrode pads on the card 101. The tray is also stronger and prevents wear and damage. Also, the front frame portion 165 does not experience wear and damage even though it comes into contact with the acting point portion 21*a* of the ejection lever 21. As a result, the tray is easier to handle and is more reliable.

The metal portion 151 includes side wall tiered portions on at least some of the outer surfaces of the side frame portions. This makes it very durable and wear resistant even when repeatedly engaging and disengaging from the holding protrusions 75*a* of the holding members 75.

The metal portion 151 is integrally formed from a metal panel, and the resin portion 169 is integrally formed with the metal portion 151 by coating at least some of the peripheral surface of the metal portion 151. As a result, a strong, durable holding member is easily manufactured at low cost.

An eaves portion 167 is also provided to support at least some of the lower surface of the card 101, and the metal portion 151 does not come into contact with the lower surface and the lower end of the side surfaces 112 of the card 101. As a result, the metal portion 151 does not come into contact with the electrode pads on the card 101 and cause a short circuit.

The metal portion 151 is a rectangular frame member. As a result, it is very strong and very durable.

The following is an explanation of the second embodiment of the present invention. All of the structures that are identical to those in the first embodiment are denoted by the same reference numbers and further explanation of these structures has been omitted. Further explanation of all operations and effects identical to those of the first embodiment has also been omitted.

Figure 7:
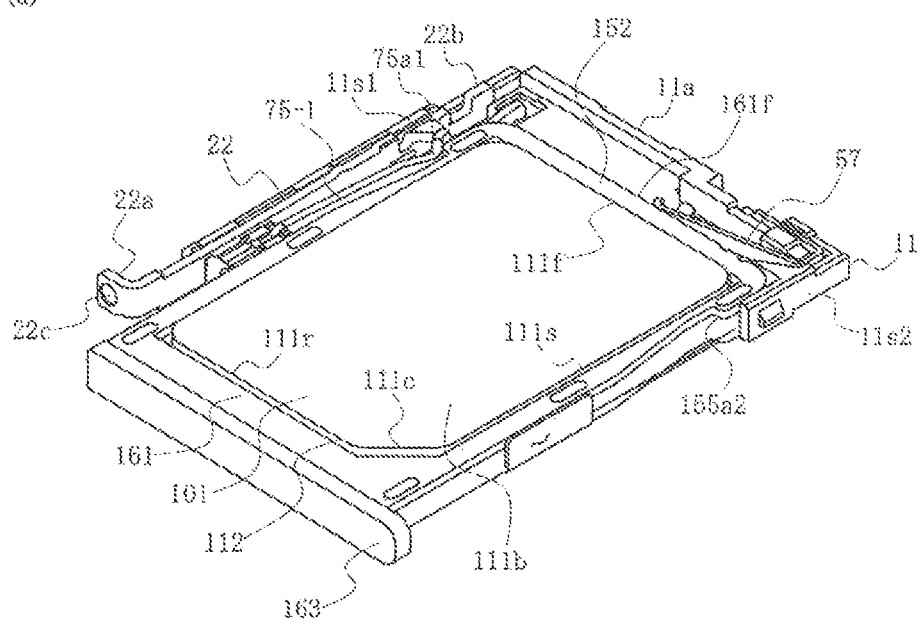
Figure 7:
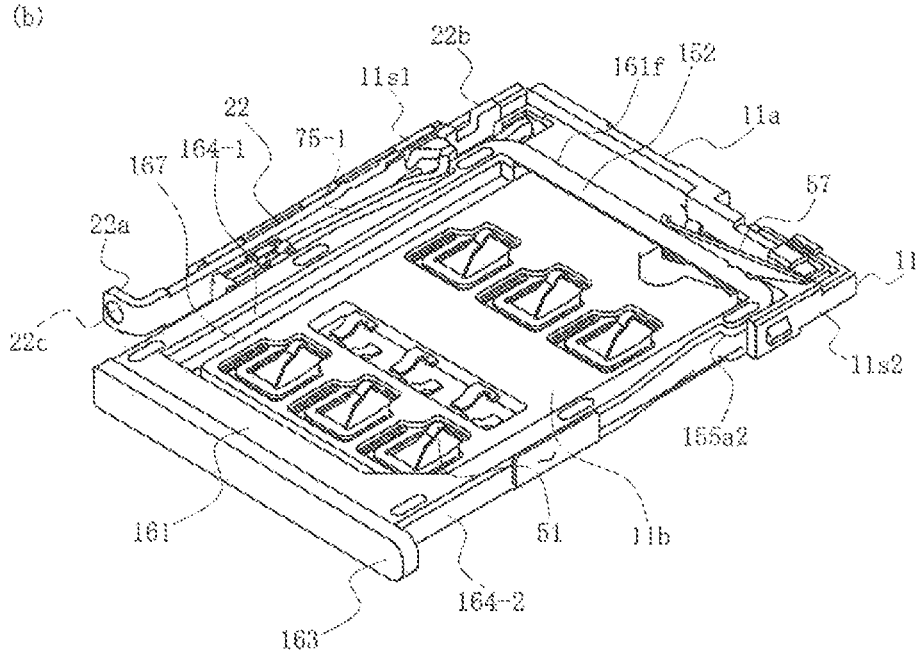
Figure 8:
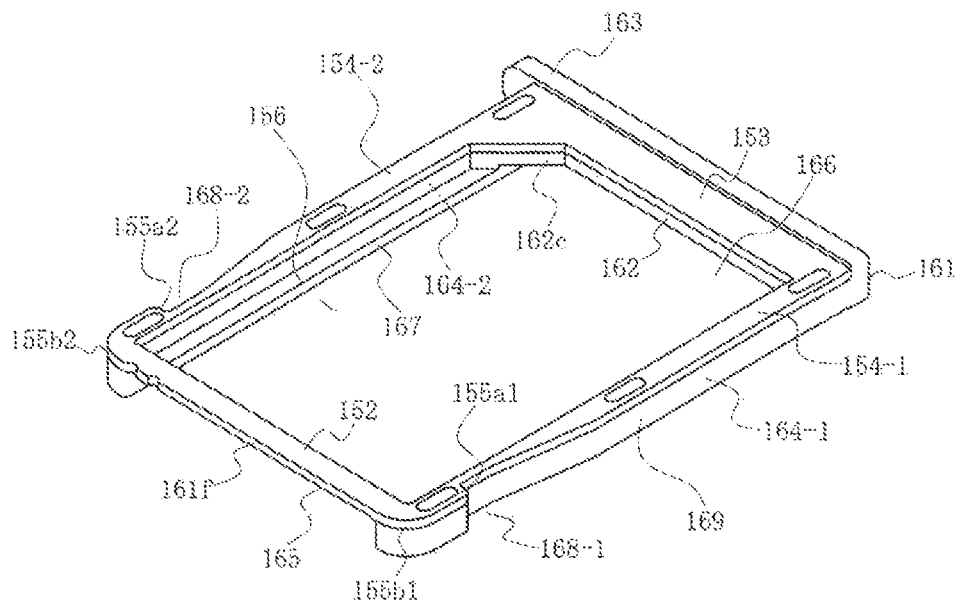
Figure 8:
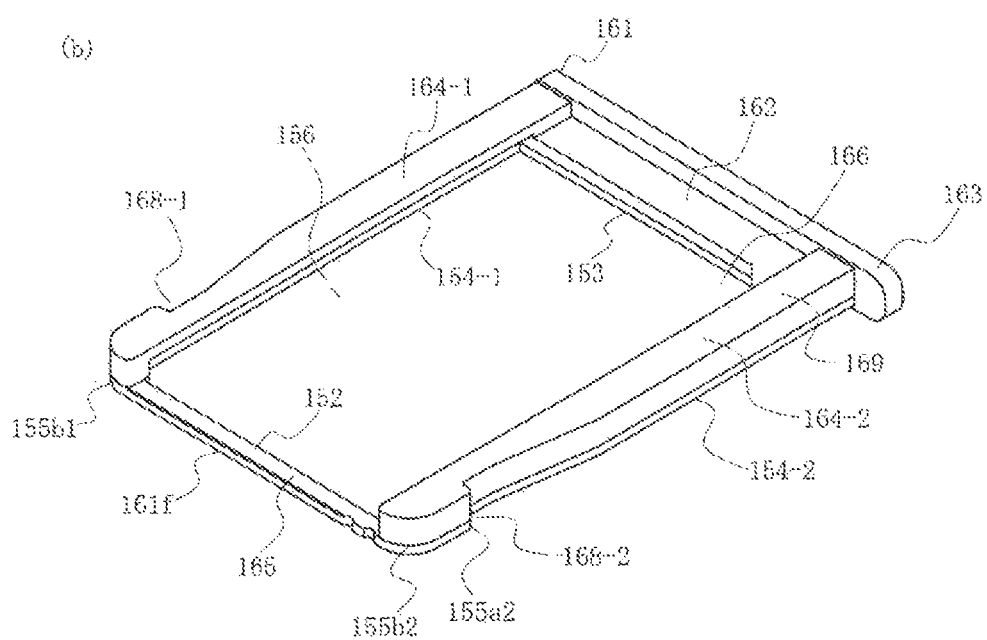
Figure 9:
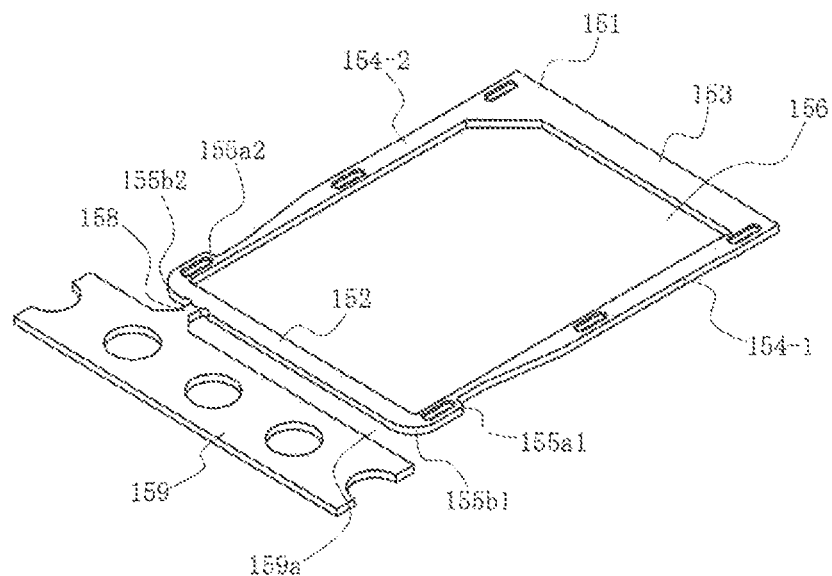
Figure 9:
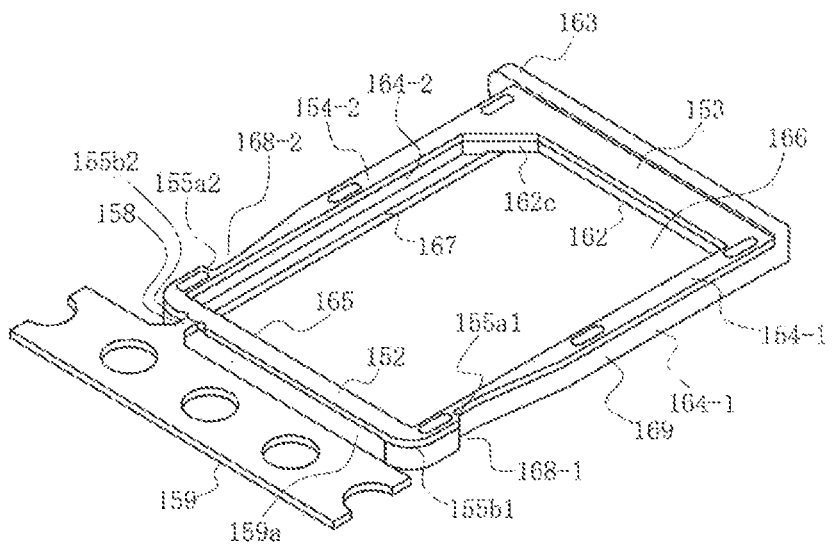
Figure 10:
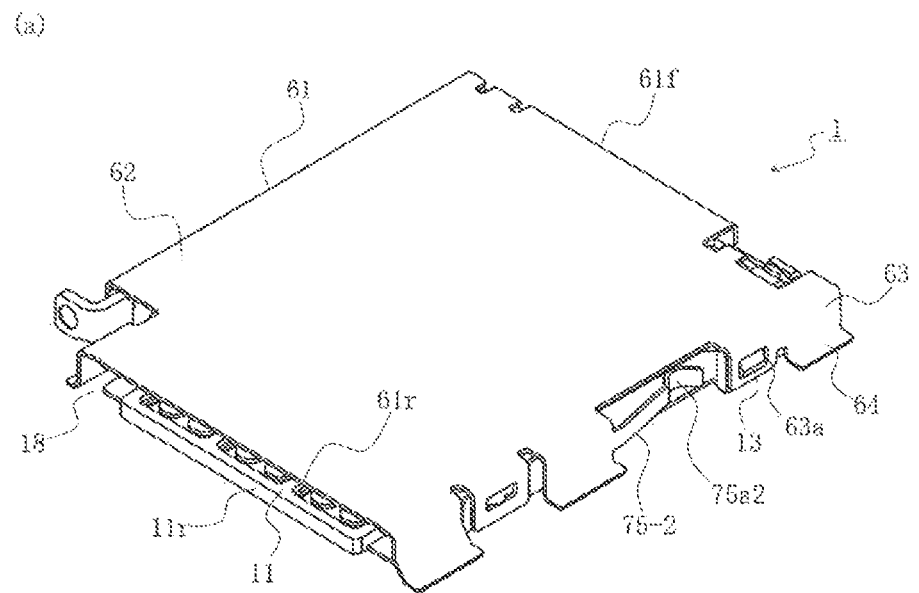
Figure 10:
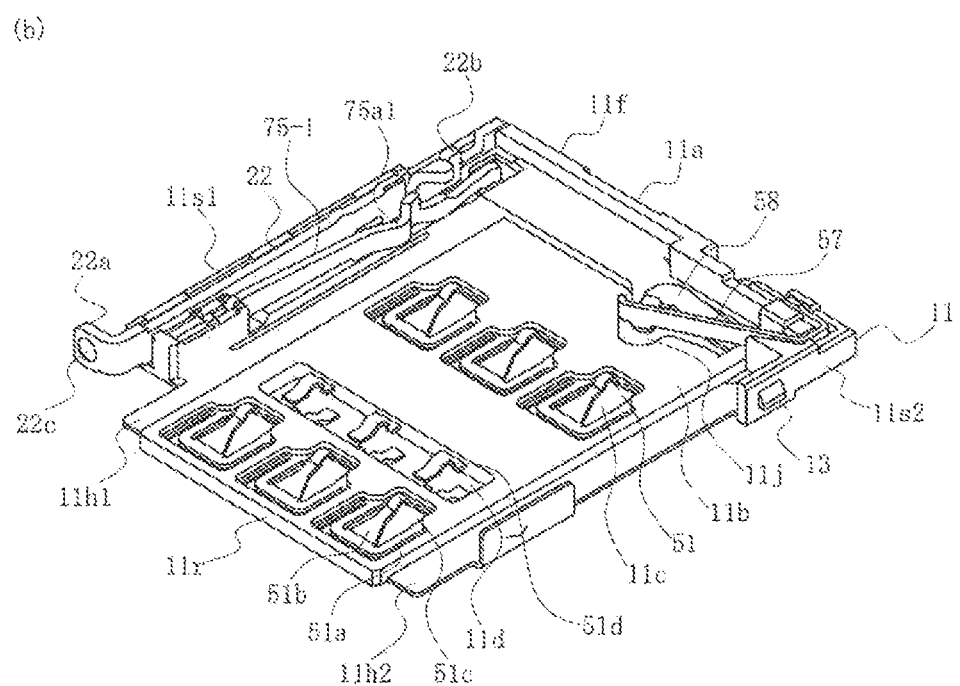

FIG. 7 is a pair of perspective views showing the card tray in the second embodiment of the present invention during use, FIG. 8 is a pair of perspective views of the card tray in the second embodiment of the present invention, FIG. 9 is a pair of perspective views used to explain how the metal portion of the card tray is coated with a resin in the second embodiment of the present invention, and FIG. 10 is a pair of perspective views of the card connector in the second embodiment of the present invention. In FIG. 7, (a) shows the card tray inserted in a card connector while accommodating a card, and (b) shows the card tray inserted in a card connector without accommodating a card. In FIG. 8, (a) is a perspective view from above, and (b) is a perspective view from below. In FIG. 9, (a) shows only the metal portion, and (b) shows the metal portion coated with a resin. In FIG. 10, (a) is a view with the shell attached, and (b) is a view with the shell removed.

The card 101 in the present invention is identical to the card 101 in the first embodiment, so further explanation of the card has been omitted.

In the card connector 1 of the present invention, a second holding member 75-2 is not housed inside the second side wall portion 11s2 of the housing 11, but is integrally formed on the right side panel portion 63 of the shell 61. In all other respects, the card connector 1 is identical to the one in the first embodiment. Because the rest of the configuration of the card connector 1 in the present embodiment is identical to the one in the first embodiment, further explanation has been omitted. For the sake of simplicity, the ejection lever 21 is not depicted in FIG. 7 and FIG. 10.

The card tray 161 of the present invention is obtained by punching and bending a metal strip to integrally form a metal portion 151, and at least a portion of the periphery is integrally coated with an insulating resin using a molding method such as insert molding and overmolding. The rest is identical to the card tray 161 in the first embodiment. However, many components included in the metal portion 151 differ from those in the card tray 161 of the first embodiment. The metal portion 151 is connected to the carrier portion 159 cut in a subsequent step for use in transport. There are a plurality of integrally formed metal portions as in the first embodiment.

The metal portion 151 of the present invention, as shown in FIG. 9 (a), is a rectangular frame portion surrounding all four sides of the rectangular opening 156 used to expose the electrode pads on the card 101, and includes a rear metal frame portion 153 and a front metal frame portion 152 extending parallel to each other in the transverse direction, and a first metal side frame portion 154-1 and a second metal side frame portion 154-2 extending in the longitudinal direction and connecting both ends of the rear metal frame portion 153 and both ends of the front metal frame portion 152. The rear metal frame portion 153, the front metal frame portion 152, the first metal side frame portion 154-1 and the second metal side frame portion 154-2 are flat panels that are flush with each other.

The metal portion 151 does not include ridge portions 153a and 152a, first metal side wall portion 155-1 and second metal side wall portion 155-2, first front side frame recessed portion 154a1 and second front side frame recessed portion 154a2, and first rear side frame recessed portion 154b1 and second rear side frame recessed portion 154b2. Here, a first side wall tiered portion 155a1 and a second metal side wall tiered portion 155a2 are formed on the outer edge of the first metal side frame portion 154-1 and the second metal side frame portion 154-2. The portions connecting both ends of the front metal frame portions 152 to the first metal side frame portion 154-1 and the second metal side frame portion 154-2 form first front end corner portion 155b1 and second front end corner portion 155b2.

As shown in FIG. 9(b), at least some of the periphery of the metal portion 151 is integrally coated with an insulating resin using a molding method such as insert molding or overmolding. The carrier portion 159 is then cut to obtain the card tray 161 shown in FIG. 8. The card tray 161, as in the case of the first embodiment, is a rectangular frame member surrounding all four sides of the space portion 166, and includes a rear frame portion 162 and a front frame portion 165 extending parallel to each other in the transverse direction, and a first side frame portion 164-1 and a second side frame portion 164-2 extending in the longitudinal direction and connecting both ends of the rear frame portion 162 and both ends of the front frame portion 165. The rear panel portion 163 is connected to the rear of the rear panel portion 162, but the coupling portion 162a and the through-hole 163a have been omitted.

With the exception of the rear panel portion 163, the upper surfaces of the rear frame portion 162, the first side frame portions 164-1, the second side frame portion 164-2, and the front frame portion 165 are flush with each other. The rear frame portion 162, the first side frame portions 164-1, and the second side frame portion 164-2 include resin portions covering the lower surfaces of the rear metal frame portion 153, the first metal side frame portion 154-1, and the second metal side frame portion 154-2. However, the front frame portion 165 includes only the front metal frame portion 152 and has no resin portion.

A first holding recessed portion 168-1 and a second holding recessed portion 168-2 are formed on the outer surface of the front side frame portion 164-1 and the second side frame portion 164-2. The front metal side frame portion 154-1 and the second metal side frame portion 154-2 are exposed on the upper end of the first holding recessed portion 168-1 and the second holding recessed portion 168-2 and, in particular, the first side wall tiered portion 155a1 and the second side wall tiered portion 155a2 are exposed on the front end of the first holding recessed portion 168-1 and the second holding recessed portion 168-2. The first front end corner portion 155b1 and the second front end corner portion 155b2 are exposed on the outer surface of the connecting portion between the front side frame portion 164-1 and the second side frame portion 164-2 and both ends of the front frame portion 165.

An eaves portion 167 extends into the space portion 166 from the inside lower ends of the first side frame portion 164-1 and the second side frame portion 164-2. The eaves portion 167 is made entirely of resin and is integrally molded with the resin coating the lower surfaces of the first metal side frame portion 154-1 and the second metal side frame portion 154-2. Therefore, the electrode pads arranged on the lower surface of a card 101 housed inside the space portion 166 does not come into contact with the metal portion 151. The peripheral edges of the electrode pads also do not come into contact with the metal portion 151 despite being exposed on the side surfaces 112 of the card 101.

The rest of the configuration of the card tray 161 is identical to that of the first embodiment, so further explanation has been omitted. Because the operation of the card connector 1 is identical to that of the first embodiment, further explanation has been omitted.

In the present embodiment, a single card 101 is housed inside the card tray 161. However, the card tray 161 can house a plurality of cards 101 inside the space portion 166 in the same manner as the fourth embodiment described below.

In the present embodiment, the card tray 161 has a metal portion 151 that is a rectangular frame member. The metal portion 151 is also exposed on the upper surfaces of the front frame portion 165, the rear frame portion 162, and the side frame portions. As a result, the card tray 161 is stronger, more durable, and does not cause a short circuit even when the metal portion 151 comes into contact with the electrode pads of the card 101. The front frame portion 165 does not experience wear or damage even when it comes into contact with the acting point portion 21a of the ejection lever 21.

Because the rest of the effects are identical to those of the first embodiment, further explanation has been omitted.

The following is an explanation of the third embodiment of the present invention. All of the structures that are identical to those in the first embodiment and the second embodiment are denoted by the same reference numbers and further explanation of these structures has been omitted. Further explanation of all operations and effects identical to those of the first embodiment and the second embodiment has also been omitted.

Figure 11:
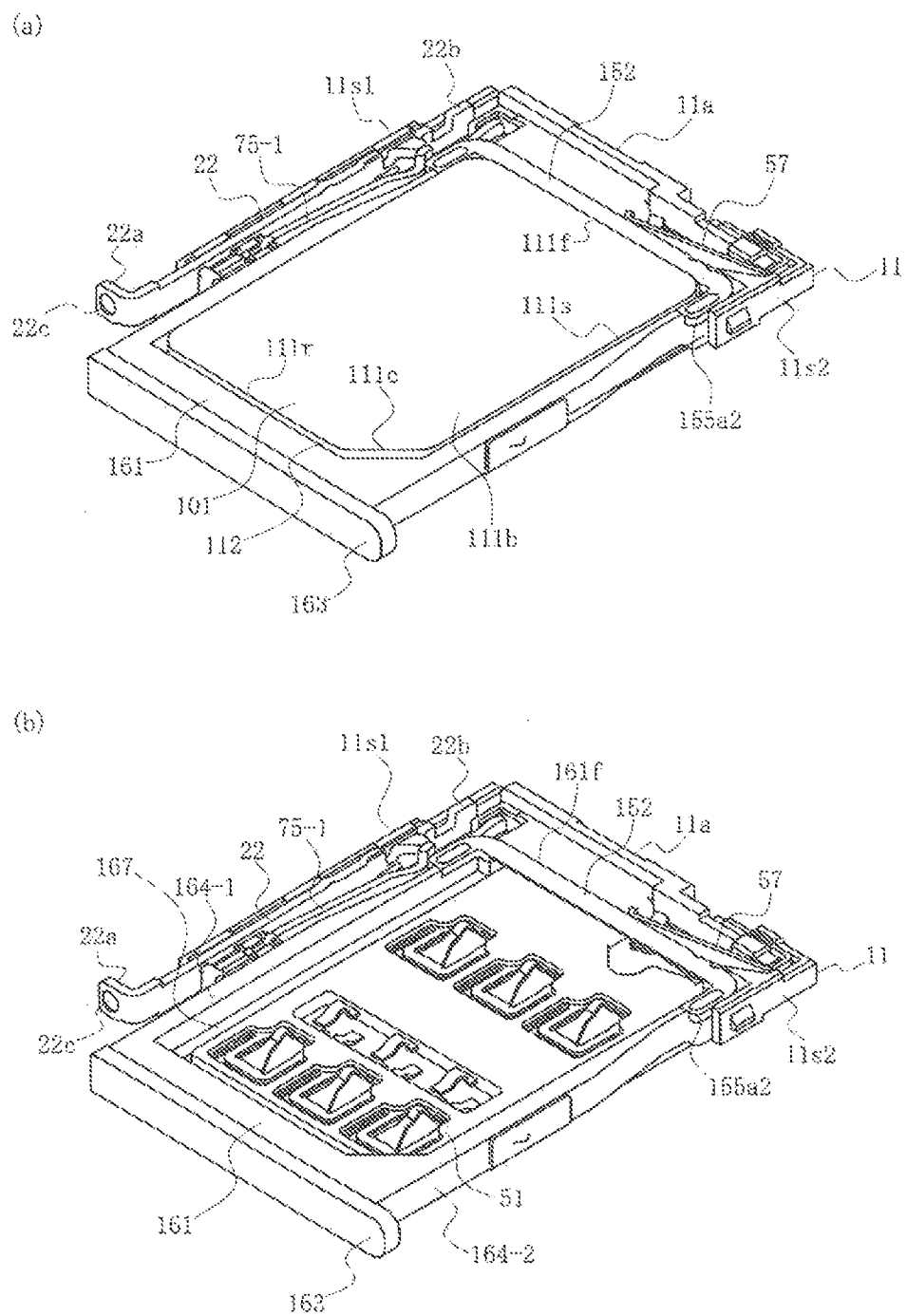
Figure 12:
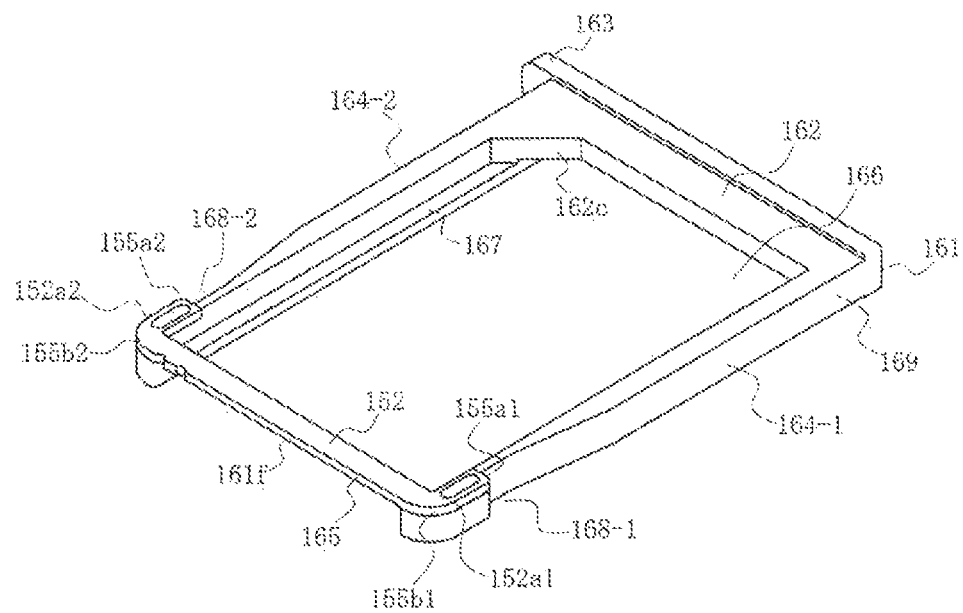
Figure 12:
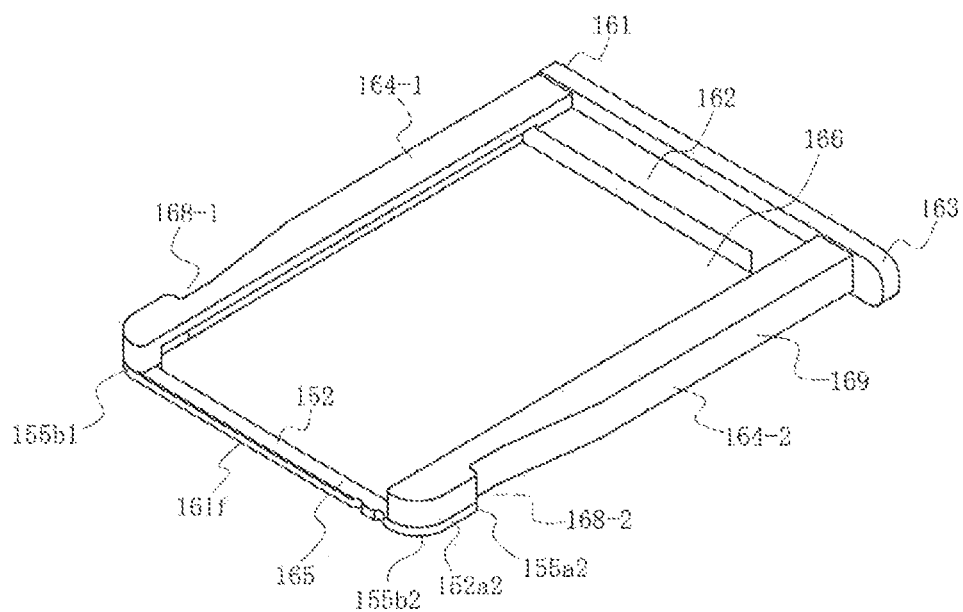
Figure 13:
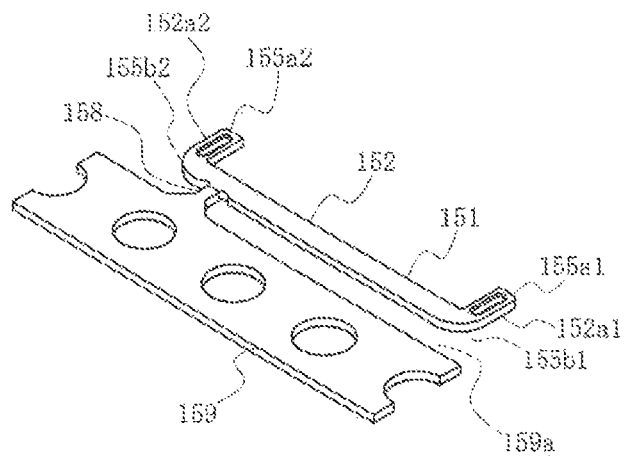
Figure 13:
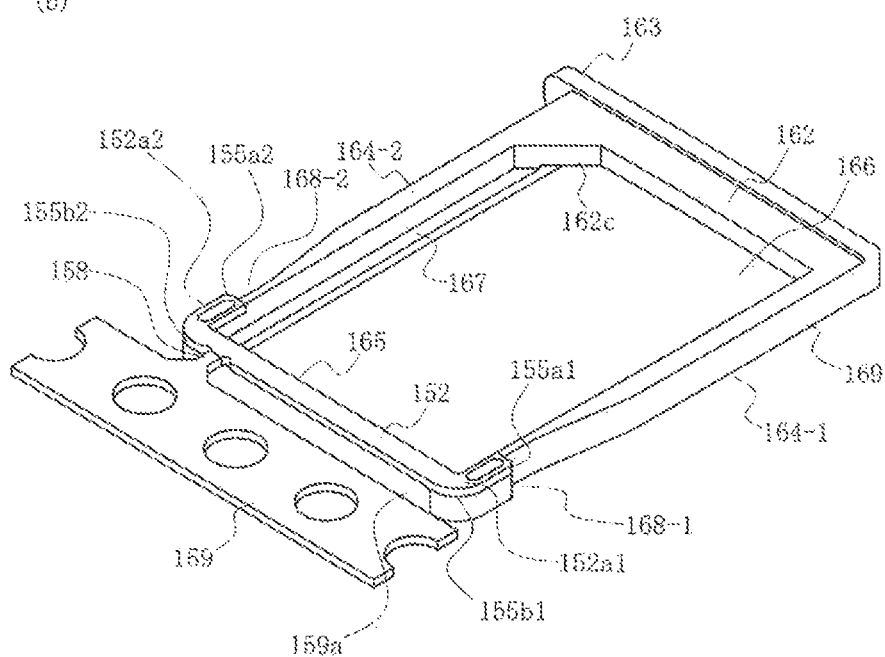

FIG. 11 is a pair of perspective views showing the card tray in the third embodiment of the present invention during use, FIG. 12 is a pair of perspective views of the card tray in the third embodiment of the present invention, and FIG. 13 is a pair of perspective views used to explain how the metal portion of the card tray is coated with a resin in the third embodiment of the present invention. In FIG. 11, (a) shows the card tray inserted in a card connector while accommodating a card, and (b) shows the card tray inserted in a card connector without accommodating a card. FIG. 12, (a) is a perspective view from above, and (b) is a perspective view from below. FIG. 13, (a) shows only the metal portion, and (b) shows the metal portion coated with a resin.

Because the card 101 in the present embodiment is identical to the cards 101 in the first and second embodiments, further explanation has been omitted.

Because the card connector 1 in the present embodiment is identical to the card connector 1 in the first and second embodiments, further explanation has been omitted.

The card tray 161 in the present embodiment is very similar to the card tray 161 in the second embodiment, but the configuration of the metal portion 151 differs from that of the card trays 161 in the second embodiment.

The metal portion 151 in the present invention is not a rectangular frame member, and does not include a rear metal frame portion 153a, first metal side frame portion 154-1, and a second metal side frame portion 154-2. When viewed from above, as shown in FIG. 13(a), it is a slender panel member with a downward-facing bracket-shaped profile extending in the transverse direction of the card tray 161, and has a front metal frame portion 152. The front metal frame portion 152 includes a first protrusion 152a1 and a second protrusion 152a2 extending to the rear from both ends. The outer angles at the lower ends of the first protrusion 152a1 and the second protrusion 152a2 function as the first side wall tiered portion 155a1 and the second side wall tiered portion 155a2. The coupling portion between both ends of the front metal frame portion 152 and the first protrusion 152a1 and the second protrusion 152a2 form the first front end corner portion 155b1 and the second front end corner portion 155b2.

As shown in FIG. 13(b), at least some of the periphery of the metal portion 151 is integrally coated with an insulating resin using a molding method such as insert molding or overmolding. The carrier portion 159 is then cut to obtain the card tray 161 shown in FIG. 12. The card tray 161, as in the second embodiment, is a rectangular frame member surrounding all four sides of the space portion 166, and includes a rear frame portion 162 and a front frame portion 165 extending parallel to each other in the transverse direction, a first side frame portion 164-1 and a second side frame portion 164-2 extending in the longitudinal direction and connecting both ends of the rear frame portion 162 and both ends of the front frame portion 165, and a rear panel portion 163 connected to the rear of the rear frame portion 162.

This differs from the card tray 161 in the second embodiment in that the metal portion 151 is not on the upper surfaces of the rear frame portion 162, the first side frame portion 164-1, and the second side frame portion 164-2. The first protrusion 152a1 and the second protrusion 152a2 are exposed on the upper surfaces of the first side frame portion 164-1 and the second side frame portion 164-2 in front of the front ends of the first holding recessed portion 168-1 and the second holding recessed portion 168-2. The first side wall tiered portion 155a1 and the second side wall tiered portion 155a2 are exposed on the front ends of the first holding recessed portion 168-1 and the second holding recessed portion 168-2. The first front end corner portion 155b1 and the second front end corner portion 155b2 are exposed on the outer surface of the connecting portion between the first side frame portion 164-1, the second side frame portion 164-2, and both ends of the front frame portion 165.

The rest of the configuration of the card tray 161 is identical to that of the second embodiment, so further explanation has been omitted. Because the operation of the card connector 1 is identical to that of the first and second embodiments, further explanation has been omitted.

In the present embodiment, a single card 101 is housed inside the card tray 161. However, the card tray 161 can house a plurality of cards 101 inside the space portion 166 in the same manner as the fourth embodiment described below.

In the present embodiment, the card tray 161 is a panel member including a metal portion 151 extending in the longitudinal direction. The front frame portion 165 does not include a resin portion 169 but is only composed of the metal portion 151. Therefore, the front frame portion 165 does not experience wear or damage even when it comes into contact with the acting point portion 21a of the ejection lever 21. In addition, a short circuit does not occur even when the metal portion 151 comes into contact with the electrode pads on the card 101.

Because the other effects are the same as those of the first and second embodiments, further explanation is omitted.

The following is an explanation of the fourth embodiment of the present invention. All of the structures that are identical to those in the first through third embodiments are denoted by the same reference numbers and further explanation of these structures has been omitted. Further explanation of all operations and effects identical to those of the first through third embodiments has also been omitted.

Figure 14:
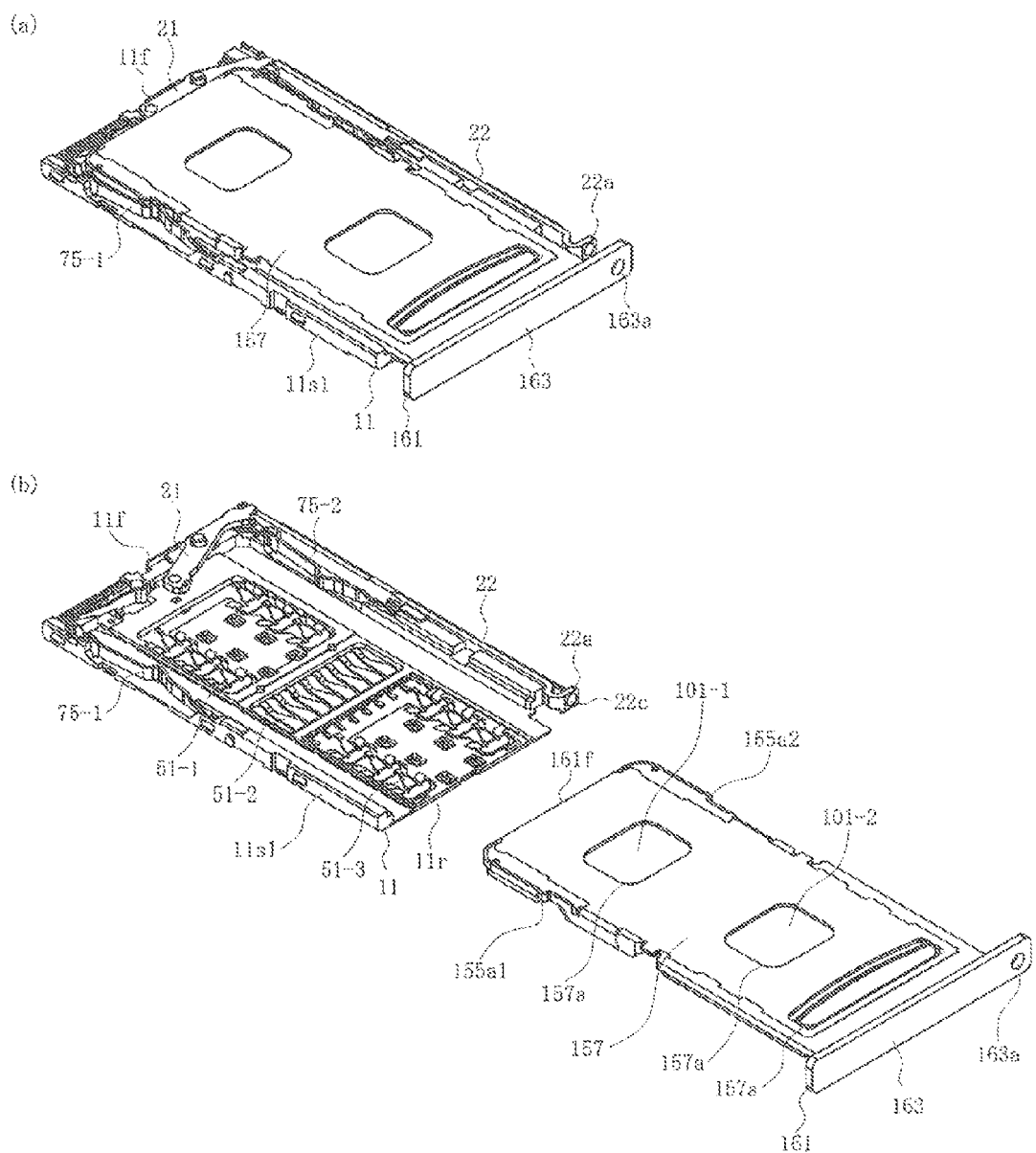
Figure 15:
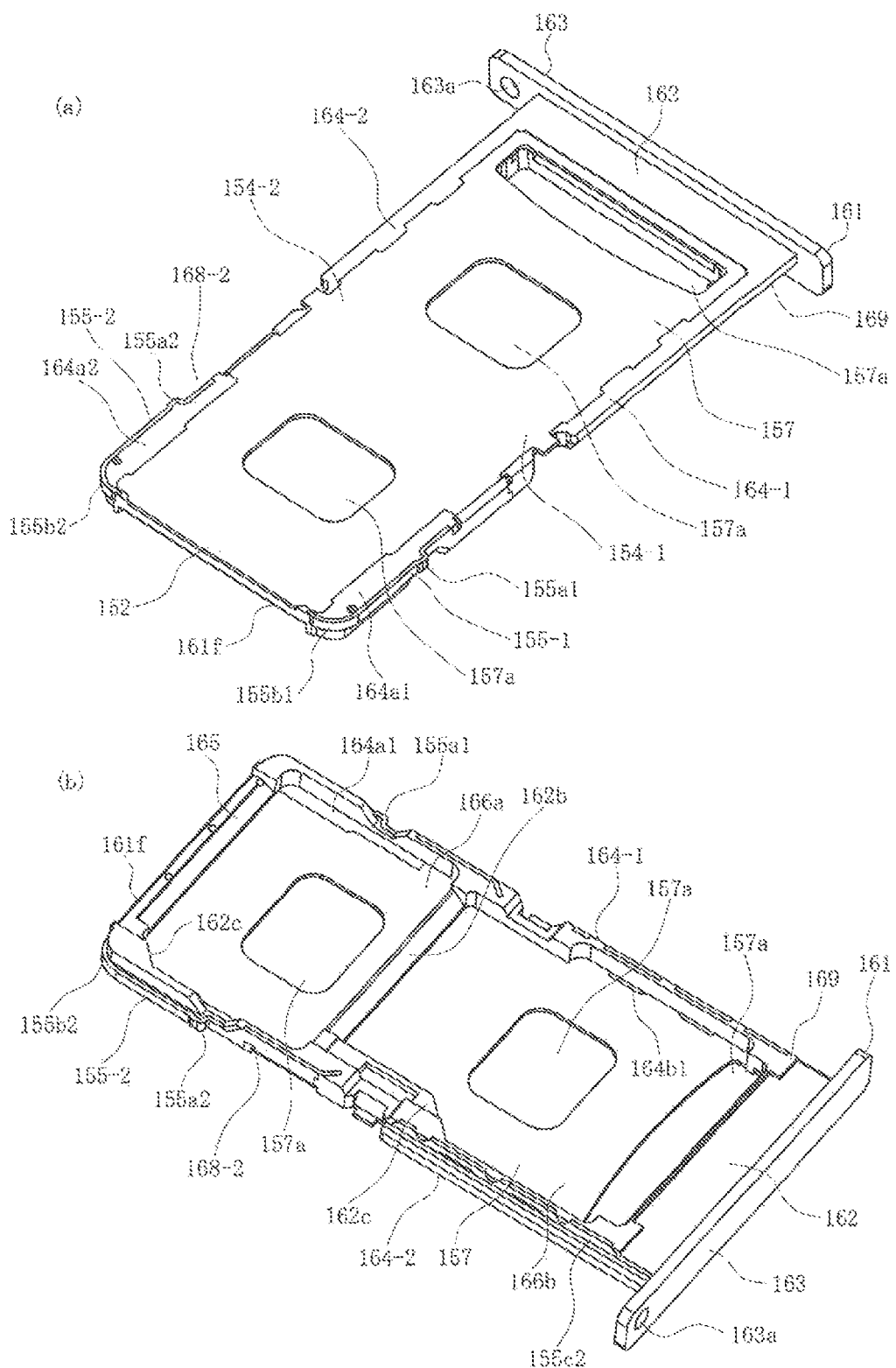
Figure 16:
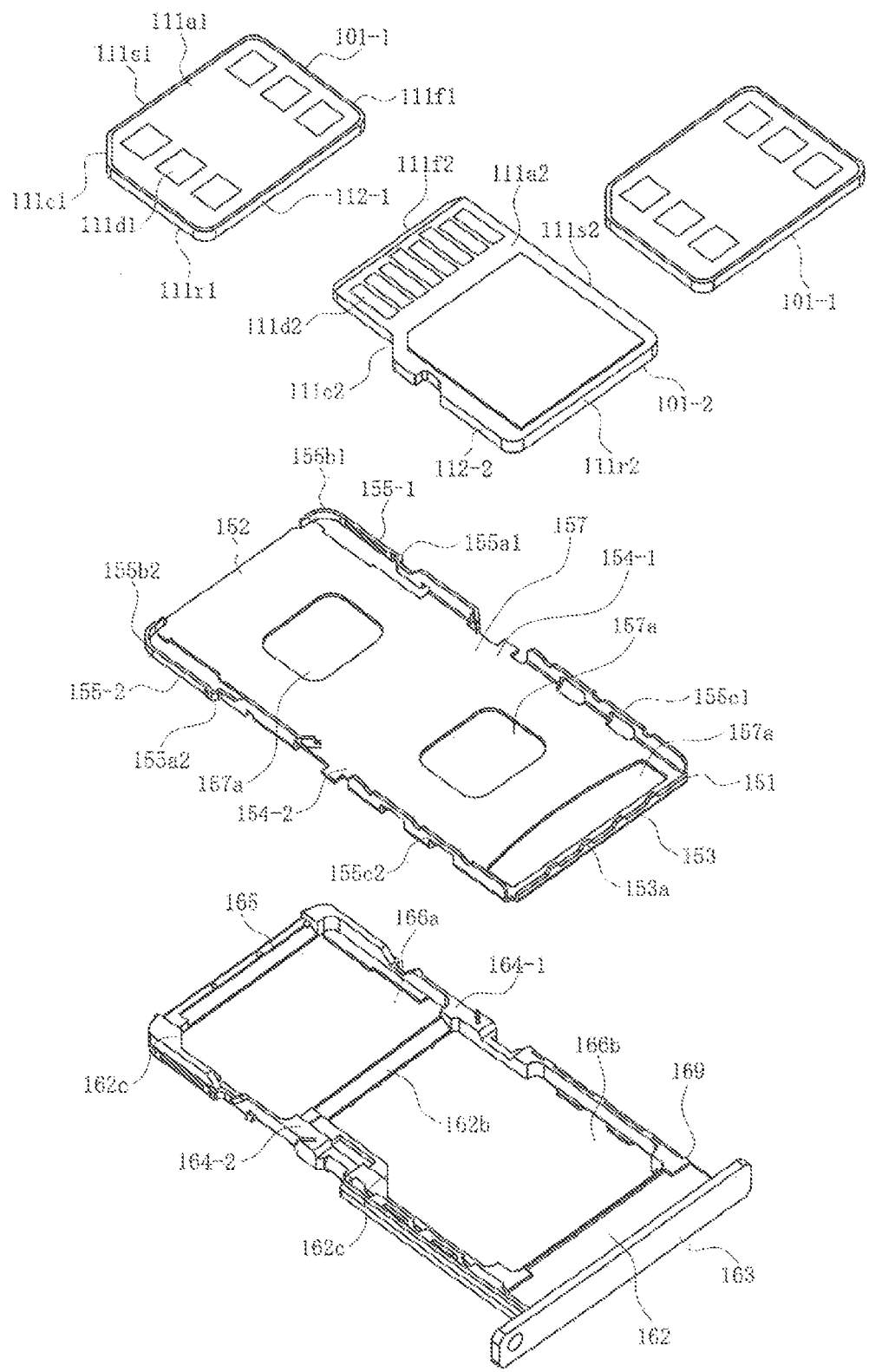
FIG. 16 is an exploded view of the fourth embodiment of the present invention showing the relationship between the card tray and the card.
Figure 16A:
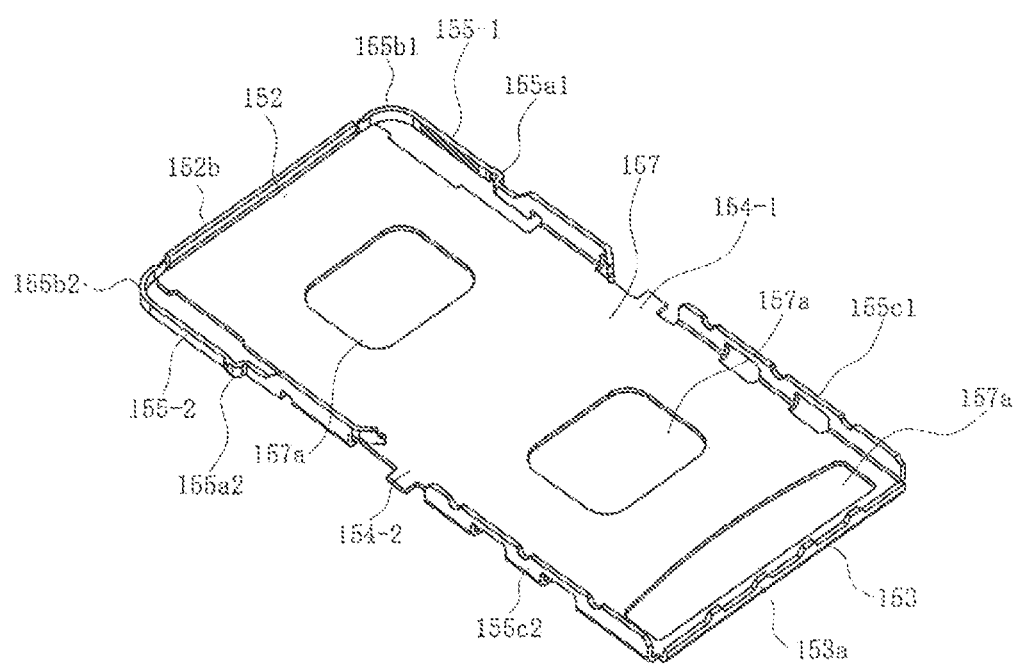
FIG. 16A is a perspective view showing a variation on the metal portion of the card tray in the fourth embodiment of the present invention.
Figure 17:
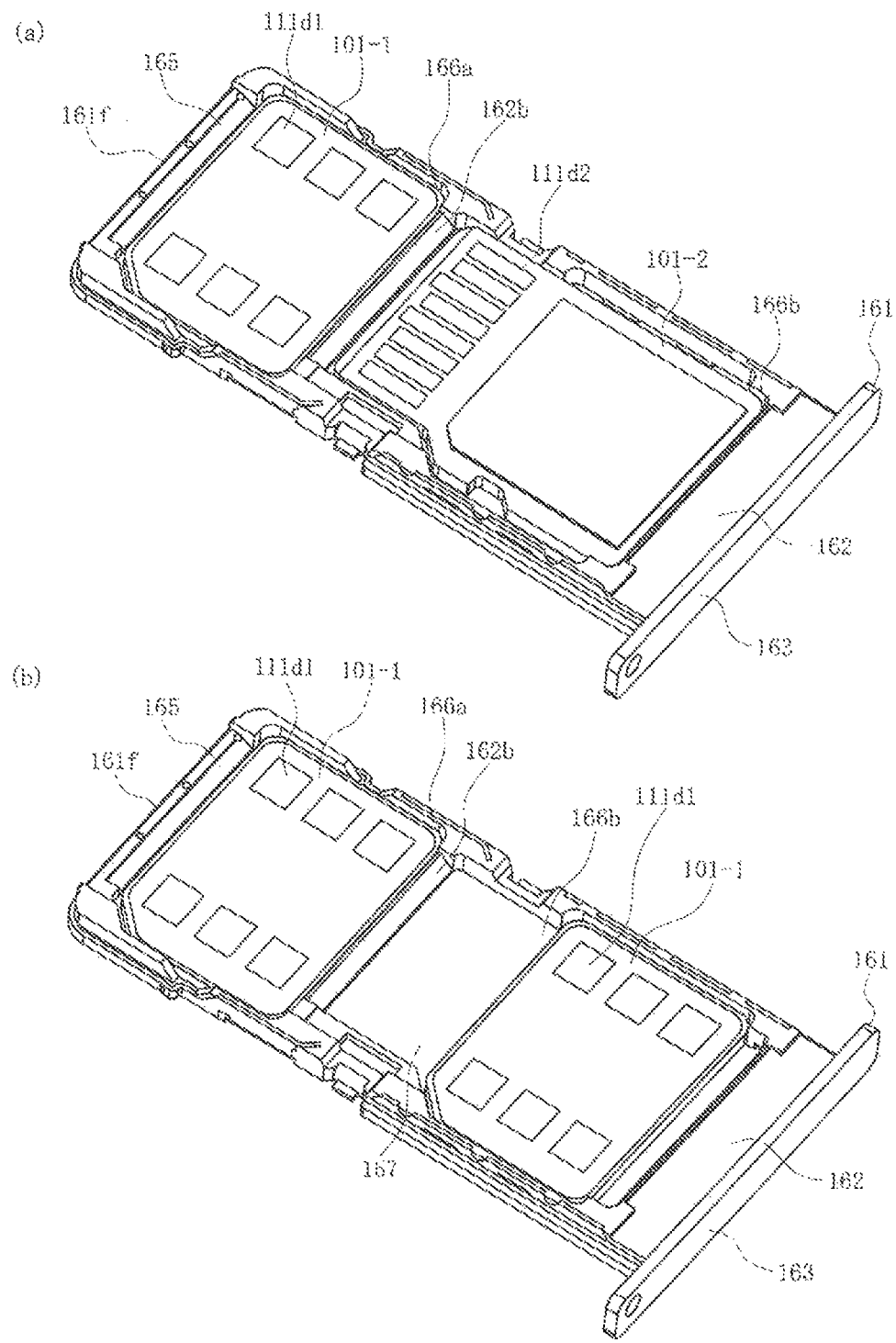
Figure 18:
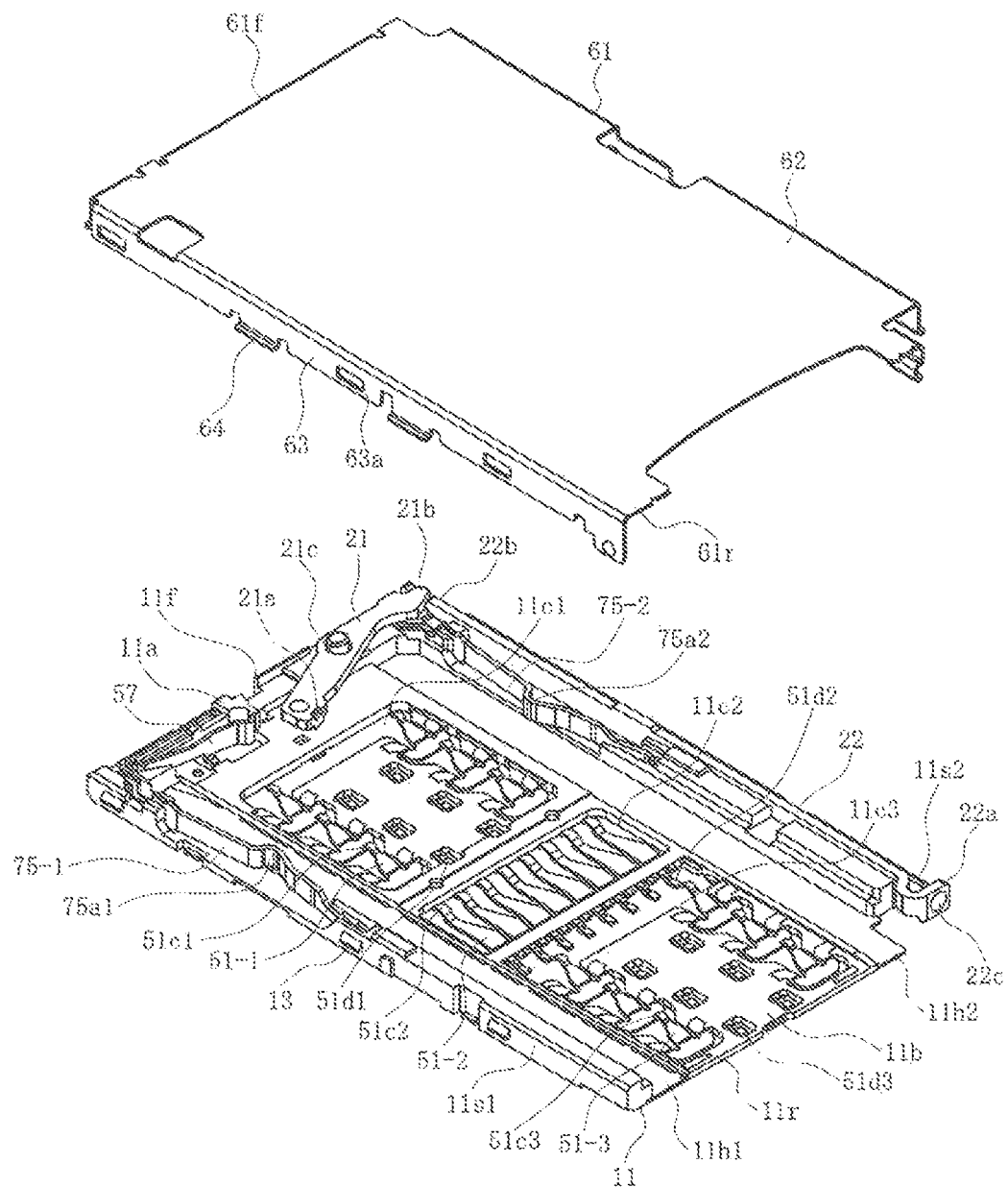
FIG. 18 is an exploded view of the card connector in the fourth embodiment of the present invention.
Figure 19:
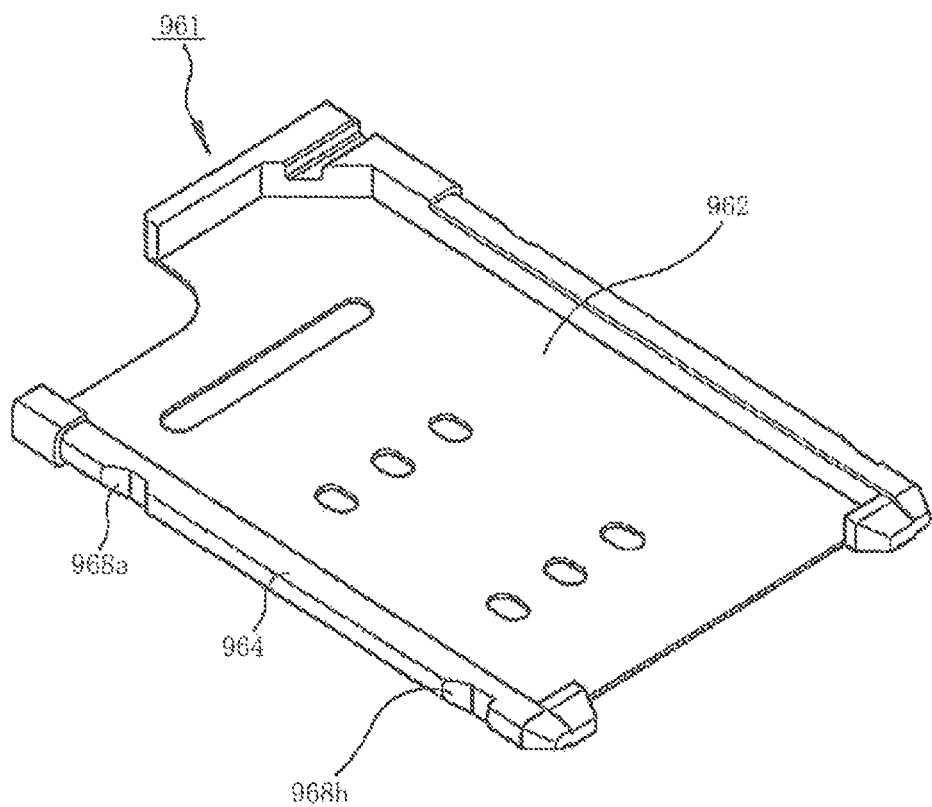
FIG. 19 is a drawing of a card tray of the prior art.

FIG. 14 is a pair of perspective views showing the card tray in the fourth embodiment of the present invention during use, FIG. 15 is a pair of perspective views of the card tray in the fourth embodiment of the present invention, FIG. 16 is an exploded view of the fourth embodiment of the present invention showing the relationship between the card tray and the card, FIG. 16A is a perspective view showing a variation on the metal portion of the card tray in the fourth embodiment of the present invention, FIG. 17 is a pair of perspective views showing a card housed in the card tray in the fourth embodiment of the present invention, and FIG. 18 is an exploded view of the card connector in the fourth embodiment of the present invention. In FIG. 14, (a) shows the card tray inserted in a card connector while accommodating a card, and (b) shows the card tray inserted in a card connector without accommodating a card. In FIG. 15, (a) is a perspective view from above, and (b) is a perspective view from below. In FIG. 17, (a) shows two cards of different types being housed, and (b) shows two cards of the same type being housed.

The space portion 166 or card housing space in the card tray 161 of the present embodiment is divided into a first space portion 166a positioned in the front, and a second space portion 166b positioned to the rear. Both the first space portion 166a and the second space portion 166b can house a single card 101. The first space portion 166a and the second space portion 166b can house two first cards 101-1 as shown in FIG. 17(b), or can house a first card 101-1 and a different type of second card 101-2 as shown in FIG. 17(a). Also, card 101 can be housed in the first space portion 166a or the second space portion 166b, and the other space portion can remain free of a card 101. When a card connector other than the card connector 1 is mounted in an electronic device, the user can store the card tray 161 not housing any cards 101, that is, the empty card tray 161, in the card connector 1.

In the following explanation of the present embodiment, the card 101 housed in the first space portion 166a is a first card 101-1, and the card 101 housed in the second space portion 166b is either a first card 101-1 or a second card 101-2. The first card 101-1 is a nanoSIM card identical to the card 101 used in the explanation of the first through third embodiments. The second card 101-2 is a microSD® card. The specifications for microSD® card according to the SD Card Association are a longitudinal width of 15 mm, a width of 11 mm, and a thickness of 1.0 mm.

When the cards 101 have to be identified as a first card 101-1 or a second card 101-2 in the following explanation of the present embodiment, the number "1" or "2" is affixed to the various components of the cards 101 as shown in FIG. 16, including the lower surface or terminal accommodating surface, the electrode pads or terminals on the lower surface, and the front end 111f, the rear end 111r, the side ends 111s, the notched portion 111c, and the side surfaces 112. When the cards 101 do not have to be identified as a first card 101-1 or a second card 101-2 and are referred to collectively or in general terms, these suffixes are not added.

The card tray 161 in the present embodiment, as in the first through third embodiments, has an integrally formed metal portion 151 obtained by punching and bending a conductive metal plate, and a resin portion 169 molded from an insulating resin using a molding method such as insertion molding or overmolding so as to cover and become integrated with at least a portion of the outer periphery of the metal portion 151. In FIG. 16, the metal portion 151 and the resin portion 169 are depicted in the card tray 161 as being formed separately. However, this depiction is a matter of convenience and not necessarily accurate. In the card tray 161 of the present embodiment, as described above, the resin portion 169 is molded from an insulating resin using a molding method such as insertion molding or overmolding so as to cover and become integrated with at least a portion of the outer periphery of the metal portion 151.

The metal portion 151 of the present embodiment also has a flat substantially rectangular bottom panel 157 covering at least the upper surface in the space portion 166 (the surface opposite the lower surface serving as the terminal accommodating surface) surrounded by the front frame portion 165, the rear frame portion 162, and the side frame portions. At least a portion of the bottom panel 157 faces the upper surface 111b of the card 101 (the surface opposite the lower surface serving as the terminal accommodating surface). In this bottom panel 157, portions near the two side edges extending in the transverse direction (short-axis direction) correspond to the front metal frame portion 152 and the rear metal frame portion 153 in the first and second embodiments, and portions near the two side edges extending in the longitudinal direction (long-axis direction) correspond to the first metal side frame portion 154-1 and the second metal side frame portion 154-2 in the first and second embodiments. A ridge portion 153a bent at a substantially right angle to the bottom panel 157 is connected to the outer edge of the rear metal frame portion 153.

In the portions closer to the front end of the bottom panel 157, that is, closer to the front metal frame portion 152, a first metal side wall portion 155-1 and a second metal side wall portion 155-2 bent in a substantially right angle to the bottom panel 157 are connected to the outer edges of the first metal side frame portion 154-1 and the second metal side frame portion 154-2. The first metal side wall portion 155-1 and the second metal side wall portion 155-2 are slender band-shaped members extending forward from the middle of the first metal side frame portion 154-1 and the second metal side frame portion 154-2 in the longitudinal direction. The first metal side wall portion 155-1 and the second metal side wall portion 155-2 have a first side wall tiered portion 155a1 and a second side wall tiered portion 155a2 formed in the middle, and a first front end corner portion 155b1 and a second front end corner portion 155b2 formed on the front end. The first front end corner portion 155b1 and the second front end corner portion 155b2 cover the front of both ends of the front metal frame portion 152. The lower end surface of the first front end corner portion 155b1 and the second front end corner portion 155b2 are substantially flush with the lower surface of the bottom panel 157.

In the variation shown in FIG. 16A, a metal front wall portion 152b bends to the rear at a substantially right angle to the front metal frame portion 152 is connected to the front end edge of the bottom panel 157, that is, to the front end edge of the front metal frame portion 152. This metal front wall portion 152b strengthens the front metal frame portion 152. Here, the front end 161f of the card tray 161, that is, the front surface of the metal front wall portion 152b is exposed to the front frame portion 165.

In the portions closer to the rear end of the bottom panel 157, that is, closer to the rear metal frame portion 153, a first metal rear side wall portion 155c1 and a second metal rear side wall portion 155c2 bent in a substantially right angle to the bottom panel 157 are connected to the outer edges of the first metal side frame portion 154-1 and the second metal side frame portion 154-2. In the example shown in the drawing, a plurality of openings 157a are formed in the bottom panel 157 which pass through the bottom panel 157 in the thickness direction. The shape, size, location, and number of openings 157a are optional. The openings 157a can even be omitted.

In the present embodiment, the card tray 161 is a substantially rectangular frame member surrounding all four sides of a space portion 166 serving as the card accommodating space for accommodating a card 101, and has a rear frame portion 162 and a front frame portion 165 extending parallel to each other in the transverse direction, and a first side frame portion 164-1 and a second side frame portion 164-2 extending in the longitudinal direction and connected to both ends of the rear frame portion 162 and the front frame portion 165. The card tray 161 also includes a middle frame portion 162b extending parallel to the rear frame portion 162 and the front frame portion 165 and connected to the left and right side frame portions to divide the space portion 166 into a first space portion 166a and a second space portion 166b. The first space portion 166a and the second space portion 166b have an upper surface which is blocked by the bottom panel 157, but remain open on the lower surface.

An inclined portion 162c forming a protrusion is formed at both the corner formed by one side frame portion (more specifically, the second side frame portion 164-2) and the front frame portion 165, and the corner formed by the second side frame portion 164-2 and the middle frame portion 162b. These inclined portions 162c serve as card orientation regulating portions. When a card 101 is oriented properly, the card 101 may be housed inside the first space portion 166a and the second space portion 166b, but when a card 101 is oriented improperly, the card 101 cannot be housed inside the first space portion 166a and the second space portion 166b.

As shown in FIG. 15 (a), with the exception of the rear panel portion 163, the upper surfaces of the rear frame portion 162, the side frame portions, and the bottom panel 157 are flush with each other. The upper surface of the front frame portion 165 is covered by the portion of the bottom surface 157 corresponding to the front metal frame portion 152, and at least the front end of the bottom panel 157 is exposed to the front end of the front frame portion 165. As shown in FIG. 15 (b), the lower surfaces of the rear frame portion 162 and the side frame portions are flush. The lower ends of the first metal side wall portion 155-1 and the second metal side wall portion 155-2 exposed on the lower surface of the side frame portions, and the lower ends of the first metal rear side wall portion 155c1 and the second metal rear side wall portion 155c2 are preferably flush with the lower surface of the side frame portions. The lower surface of the front frame portion 165 is preferably higher than the lower surface of the card 101 housed and held inside the first space portion 166a and the second space portion 166b. In this way, when the card tray 161 is inserted into the card connector 1, the front frame portion 165 is kept from coming into contact with the terminals 51. The lower surface of the middle frame portion 162b is preferably higher than the lower surface of the card 101 housed and held inside the first space portion 166a, and preferably has an inclined surface facing the upper surface from the lower surface of the middle frame portion 162b in the direction of insertion. In this way, when the card 101 is housed inside the first space portion 166a but the card 101 is not housed inside the second space portion 166b, the terminals 51 are kept from becoming deformed when the card tray 161 is removed from the card connector 1, and the card 101 or middle frame portion 162b comes into contact with the terminals 51 and displaces the terminals 51 downwards.

A first front island portion 164a1, a second front island portion 164a2, a first rear island portion 164b1 and a second rear island portion 164b2, which are sections of the resin portion 169, are formed in the lower surface of the bottom panel 157 at the boundary between the first metal side wall portion 155-1 and the second metal side wall portion 155-2 and the first metal rear side wall portion 155c1 and the second metal rear wall portion 155c2. The lower surfaces of the first front island portion 164a1, the second front island portion 164a2, the first rear island portion 164b1, and the second rear island portion 164b2 are lower than the lower surface of the bottom panel 157. As a result, the upper surface 111b of a card 101 housed in the space portion 166 does not come into contact with the metal bottom panel 157 even when it has come into contact with the lower surfaces of the first front island portion 164a1, the second front island portion 164a2, the first rear island portion 164b1, and the second rear island portion 164b2, which are all made of an insulating resin.

The side surfaces of the rear frame portion 162, the side frame portions, the front frame portion 165, and the middle frame portions 162b facing the space portion 166, that is, the inner surfaces, are all coated with an insulating resin, and the metal portion 151 is not exposed. As a result, the outer edges of the electrode pads on the lower surface of a card 101 housed inside the space portion 166 does not come into contact with the metal portion 151 even when exposed on the side surfaces 112 of the card 101.

The rest of the configuration of the card tray 161 is identical to the first embodiment, so further explanation has been omitted.

As shown in FIG. 18, the bottom wall portion 11b of the housing 11 of the card connector 1 in the present embodiment includes a first terminal holding recessed portion 11c1, a second terminal holding recessed portion 11c2, and a third terminal holding recessed portion 11c3 housing and holding the exposed portions of a first terminal 51-1, a second terminal 51-2, and a third terminal 51-3. The first terminal holding recessed portion 11c1, second terminal holding recessed portion 11c2, and third terminal holding recessed portion 11c3 are openings in the bottom wall portion 11b passing through in the thickness direction.

The first terminal 51-1 and third terminal 51-3 form a row extending in the longitudinal direction of the housing 11. In the example shown in the drawing, there are two parallel rows of three terminals. At least a portion of the first terminal 51-1 and the third terminal 51-3 is embedded in the bottom wall portion 11b, and at least contact portions 51c1 and 51c3 are exposed in the first terminal holding recessed portion 11c1 and the third terminal holding recessed portion 11c3. Solder tail portions 51d1 and 51d3 serving as the solder mounting portions are exposed on the lower surface of the bottom wall portion 11b. Contact portions 51c1 and 51c3 are biased upwards by the spring action of the arm portions of first terminal 51-1 and third terminal 51-3, and make contact with electrode pads 111d1 on the first card 101-1 inside the card tray 161 held inside the card connector 1. The solder tail portions 51d 1 and 51d3 are connected electrically by soldering to a signal line, contact pad, or terminal formed on a board (not shown).

The second terminal 51-2 is arranged in parallel to form a single row extending in the transverse direction of the housing 11. At least a portion of the second terminal 51-2 is embedded in the bottom wall portion 11b, and at least the contact portion 51c2 is exposed inside the second terminal holding recessed portion 11c2. The soldering tail portion 51d2 serving as the solder mounting portion is exposed on the lower surface of the bottom wall portion 11b. The contact portion 51c2 is biased upwards by the spring action of the arm portion of second terminal 51-2, and makes contact with an electrode pad 111d2 on the second card 101-2 inside the card tray 161 held inside the card connector 1. The solder tail portion 51d2 is connected electrically by soldering to a signal line, contact pad, or terminal formed on the board. The number and arrangement of first terminals 51-1, second terminals 51-2, and third terminals 51-3 can be changed to conform to the number and arrangement of electrode pads on the card 101.

In the present embodiment, the tray ejection rod housing portion 11g is formed in the second wall side portion 11s2 but not in the first side wall portion 11s1, and the push rod 22 slides along the second side wall portion 11s2 in the longitudinal direction.

The rest of the configuration of the card connector 1 is identical to that of the first embodiment, so further explanation has been omitted.

The following is an explanation of the operations of the card connector 1 in the present embodiment. The operations associated with insertion of a card tray 161 will be explained first.

First, as shown in FIG. 14(b), the user manually positions a card tray 161 housing a card 101 to the rear of the insertion slot 18 in the card connector 1, moves the card tray 161 closer to the insertion slot 18, and inserts the tray via the insertion slot 18 into the card insertion space formed by the housing 11 and the shell 61.

Here, the card tray 161 can house two first cards 101-1 as shown in FIG. 17 (b), or can house a first card 101-1 and a second card 101-2 as shown in FIG. 17 (a). The first space portion 166a or the second space portion 166b can house a card 101 while the other space portion is free of a card 101. In any case, each card 101 is housed in a space portion 166 with the upper surface 111b facing the bottom panel 157, and the lower surface including the electrode pads exposed to the lower surface of the space portion 166. In the following explanation, as shown in FIG. 17 (a), a first card 101-1 is housed inside the first space portion 166a and a second card 101-2 is housed inside the second space portion 166b.

The card tray 161 is inserted in the correct orientation, that is, with the bottom panel 157 facing upwards, that is, towards the ceiling panel portion 62 of the shell portion 61, and the front frame portion 165 facing the front end portion 61f of the shell 61. As a result, the cards 101 housed inside the card tray 161 have their lower surface open downward facing the bottom wall portion 11b of the housing 11 including the terminals 51.

Next, when the user pushes the card tray 161 in further, the card tray 161 reaches the predetermined portion in the card connector 1 as shown in FIG. 14(a). The contact portions 51c1 of the first terminals 51-1 come into contact with the electrode pads 111d 1 on the first card 101-1, and the contact portions 51c2 of the second terminals 51-2 come into contact with the contact pads 111d2 on the second card 101-2 to establish an electrical connection.

The rest of the operations associated with inserting the card tray 161 are identical to those in the first embodiment, so further explanation has been omitted. Because the operations associated with ejecting the card tray 161 from the card connector 1 are identical to those in the first embodiment, further explanation has been omitted.

In the explanation of the present embodiment, a plurality of cards 101 could be housed inside the space portion 166 of the card tray 161. However, a single card 101 can be housed inside the space portion 166 of the card tray 161 in a manner similar to the first through third embodiments.

In the present embodiment, the card tray 161 has a metal portion 151 which is a member extending in the transverse and longitudinal directions, and at least covers the surface opposite the lower surface 111a of the card 101 in the space portion 166 defined by the front frame portion 165, the rear frame portion 162, and the side frame portions. As a result, the card tray 161 is stronger, more durable, and does not cause a short circuit even when the metal portion 151 comes into contact with the electrode pads of the card 101.

Also, at least some of the metal portion 151 faces the upper surface 111b of the card 101. The card tray 161 can also house a larger number of cards 101.

Because the other effects are the same as those of the first through third embodiments, further explanation of these effects has been omitted.

The present invention is not restricted to these embodiments, and other variations are possible on the basis of the spirit of the present invention without departing from the scope of the present invention.

The present invention can be applied to a card holding member and to a card connector.

The invention claimed is:

1. A card tray comprising:
a substantially rectangular frame member having a front frame portion, a rear frame portion, and side frame portions connecting the front and rear frame portions, the frame member defining a card accommodating space between the front, rear and side frame portions, the frame member having a first portion thereof that is formed of metal and a second portion thereof that is formed of resin, at least a portion of the first portion extending to, and being exposed at, a front end of the front frame portion, the first portion having a front metal frame portion which has a front metal wall portion that is bent downward at a right angle relative to the front frame metal portion.

2. The card tray according to claim 1, wherein the first portion includes a side wall tiered portion exposed in at least a portion of an outer side surface of the side frame portions.

3. The card tray according to claim 1, wherein the first portion is a member formed integrally from a panel member made of metal, and the second portion is a member formed so as to cover at least a portion of a periphery of the first portion and so as to be integrated with the first portion.

4. The card tray according to claim 1, further comprising a card supporting portion which protrudes from the rear and side frame portions and into the card accommodating space.

5. The card tray according to claim 1, wherein the first portion is a substantially rectangular frame member.

6. A card connector able to receive a card tray according to claim 1, the card connector comprising an ejection lever able to make contact with the first portion that is exposed at the front end of the front frame portion.

7. The card tray according to claim 1, wherein each of the first and second portions form the front frame portion and each extend from one of the side frame portions to the other one of the side frame portions.

8. A card tray comprising:
a substantially rectangular frame member having a front frame portion, a rear frame portion, and side frame portions connecting the front and rear frame portions, the frame member defining a card accommodating space between the front, rear and side frame portions, the frame member having a first portion that is formed of metal and a second portion that is formed of resin, the front frame portion not including the second portion and being composed entirely of the first portion, the first portion having a front metal frame portion which has a front metal wall portion that is bent downward at a right angle relative to the front metal frame portion.

9. The card tray according to claim 8, wherein the first portion includes a side wall tiered portion exposed in at least a portion of an outer side surface of the side frame portions.

10. The card tray according to claim 8, wherein the first portion is a member integrally formed from a panel member made of metal, and the second portion is a member formed so as to cover at least a portion of a periphery of the first portion and so as to be integrated with the first portion.

11. The card tray according to claim 8, wherein the first portion is a substantially rectangular frame member.

12. The card tray according to claim 8, further comprising a card supporting portion which protrudes from the rear and side frame portions and into the card accommodating space.

13. A card connector able to receive a card tray according to claim 8, the card connector comprising an ejection lever able to make contact with the front frame portion.

\* \* \* \* \*